United States Patent
Glackin et al.

(10) Patent No.: US 11,042,345 B2
(45) Date of Patent: Jun. 22, 2021

(54) SYSTEMS, DEVICES, AND METHODS FOR INTERACTIVE VISUAL DISPLAYS

(71) Applicant: North Inc., Kitchener (CA)

(72) Inventors: Kyle Glackin, San Francisco, CA (US); Nairey Keshishian, San Francisco, CA (US); Lisa Marie Zane, Kitchener (CA); Walter J. S. Hermsen, Waterloo (CA); Cheryl Eng, San Francisco, CA (US); Bridget Cinquegrano, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/556,777

(22) Filed: Aug. 30, 2019

(65) Prior Publication Data

US 2020/0073613 A1 Mar. 5, 2020

Related U.S. Application Data

(60) Provisional application No. 62/725,514, filed on Aug. 31, 2018.

(51) Int. Cl.
*G06F 3/14* (2006.01)
*G06F 3/147* (2006.01)
*H04W 4/14* (2009.01)

(52) U.S. Cl.
CPC ............ *G06F 3/147* (2013.01); *G06F 3/1423* (2013.01); *H04W 4/14* (2013.01)

(58) Field of Classification Search
CPC ....... G06F 3/1423; G06F 3/147; G09G 3/003; H04W 4/12; H04W 4/14
USPC ..... 345/8, 156, 170–178, 690, 1.3, 419, 633
See application file for complete search history.

(56) References Cited

U.S. PATENT DOCUMENTS

| | | | | |
|---|---|---|---|---|
| 5,983,543 A | * | 11/1999 | Hillstrom | G09F 13/0413 312/139 |
| 8,055,296 B1 | * | 11/2011 | Persson | H04M 1/6058 455/556.1 |
| 8,264,422 B1 | * | 9/2012 | Persson | G06Q 10/087 345/8 |
| 8,823,663 B2 | * | 9/2014 | Ryu | G06F 3/041 345/173 |
| 2003/0160755 A1 | * | 8/2003 | Gettemy | G06F 1/1613 345/156 |
| 2003/0184868 A1 | * | 10/2003 | Geist | G02B 27/0172 359/630 |
| 2004/0066709 A1 | * | 4/2004 | Morykwas | H04N 21/47 368/10 |

(Continued)

*Primary Examiner* — Tony O Davis

(57) ABSTRACT

Systems, devices, and methods for visual displays are described. Such visual displays may be used in a retail environment to provide interactive presentations to customers. The visual displays may include a display panel, a visual source, and a controller. The display panel may present images and/or video to a user, in which the images and/or video are generated by the visual source. The controller may determine the types of images and/or video to be presented based upon communications received from a user via a communication device or a user kiosk. The display panel may be a variable height and may be offset from the floor or a shelf by a variable distance. A plurality of display panels may be arranged on a display floor to provide retail experiences to customers and/or may be received by one or more docks placed in the display floor.

26 Claims, 16 Drawing Sheets

(56) References Cited

U.S. PATENT DOCUMENTS

| | | | |
|---|---|---|---|
| 2004/0130797 A1* | 7/2004 | Leigh Travis | G02B 27/0101 359/631 |
| 2006/0012884 A1* | 1/2006 | Snorteland | G02B 27/017 359/630 |
| 2007/0035706 A1* | 2/2007 | Margulis | G09G 3/342 353/122 |
| 2007/0069975 A1* | 3/2007 | Gettemy | G06F 1/1652 345/1.3 |
| 2008/0012996 A1* | 1/2008 | Choi | G09F 19/18 348/744 |
| 2008/0186255 A1* | 8/2008 | Cohen | G06F 3/03545 345/8 |
| 2008/0192027 A1* | 8/2008 | Morrison | G06F 3/043 345/177 |
| 2009/0040355 A1* | 2/2009 | Huang | H04N 9/3194 348/333.01 |
| 2009/0146965 A1* | 6/2009 | Hildebrandt | G06Q 10/10 345/173 |
| 2009/0244413 A1* | 10/2009 | Ishikawa | G06F 3/044 349/12 |
| 2010/0039353 A1* | 2/2010 | Cernasov | G02B 27/017 345/8 |
| 2010/0328223 A1* | 12/2010 | Mockarram-Dorri | G06F 1/1692 345/173 |
| 2011/0084893 A1* | 4/2011 | Lee | G06F 3/0486 345/6 |
| 2012/0256823 A1* | 10/2012 | Lee | G06F 3/011 345/156 |
| 2012/0256854 A1* | 10/2012 | Lee | G06F 3/017 345/173 |
| 2012/0284606 A1* | 11/2012 | Sitrick | G06Q 10/101 715/232 |
| 2012/0293325 A1* | 11/2012 | Lahcanski | G06F 3/013 340/539.13 |
| 2012/0293394 A1* | 11/2012 | Lahcanski | G02B 27/017 345/8 |
| 2012/0293546 A1* | 11/2012 | Lahcanski | G09G 5/00 345/633 |
| 2012/0297014 A1* | 11/2012 | Lahcanski | G06F 3/013 709/217 |
| 2013/0307842 A1* | 11/2013 | Grinberg | G06F 3/011 345/419 |
| 2013/0314923 A1* | 11/2013 | Seo | F21V 14/02 362/282 |
| 2014/0035942 A1* | 2/2014 | Yun | G06F 1/1637 345/592 |
| 2014/0075349 A1* | 3/2014 | Yun | G06F 16/487 715/764 |
| 2014/0146127 A1* | 5/2014 | He | H04N 7/144 348/14.08 |
| 2014/0176417 A1* | 6/2014 | Young | G06F 1/163 345/156 |
| 2014/0267960 A1* | 9/2014 | Ward | G02F 1/133528 349/15 |
| 2014/0306900 A1* | 10/2014 | Son | G06F 3/041 345/173 |
| 2014/0313189 A1* | 10/2014 | Dominici | G02B 27/01 345/419 |
| 2015/0123997 A1* | 5/2015 | Hayasaka | G02B 27/0101 345/633 |
| 2015/0341435 A1* | 11/2015 | Hamada | H04L 67/1078 709/205 |
| 2016/0022056 A1* | 1/2016 | Friesen | A47F 5/0062 108/93 |
| 2016/0110010 A1* | 4/2016 | Lee | G06F 3/0488 345/173 |
| 2016/0212256 A1* | 7/2016 | Gan | H04N 5/2257 |
| 2018/0067307 A1* | 3/2018 | Liubakka | G06F 3/14 |
| 2019/0037066 A1* | 1/2019 | Han | H04M 1/725 |

\* cited by examiner

SYSTEMS, DEVICES, AND METHODS FOR INTERACTIVE VISUAL DISPLAYS

BACKGROUND

Technical Field

The present systems, devices, and methods generally relate to electronic display technologies and particularly relate to electronic display technologies that are well-suited for use in-store retail environments.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems.

The convenience afforded by the portability of electronic devices has fostered a huge industry. Smartphones, audio players, laptop computers, tablet computers, and eBook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Wearable Heads-Up Displays

While wearable electronic devices may be carried and, at least to some extent, operated by a user without encumbering the user's hands, many wearable electronic devices include at least one electronic display. Typically, in order for the user to access (Le, see) and interact with content presented on such electronic displays, the user must modify their posture to position the electronic display in their field of view (e.g., in the case of a wristwatch, the user may twist their arm and raise their wrist towards their head) and direct their attention away from their external environment towards the electronic display (e.g., look down at the wrist bearing the wristwatch). Thus, even though the wearable nature of a wearable electronic device allows the user to carry and, to at least some extent, operate the device without occupying their hands, accessing and/or interacting with content presented on an electronic display of a wearable electronic device may occupy the user's visual attention and limit their ability to perform other tasks at the same time.

The limitation of wearable electronic devices having electronic displays described above may be overcome by wearable heads-up displays. A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

In some implementations, wearable heads up displays may be custom fit to a user's head and face. Such custom fit, wearable heads up displays may provide a better experience for the user. Such a custom fit, though, can create problems for selling and marketing the wearable head up displays, such as, for example, in retail locations or exhibitions. In such situations, a large number of differently sized wearable heads up displays may need to be kept on hand, at the retail location for example, to accommodate the various and different head shapes and sizes of potential customers. This situation, however, may create issues. One such issue, for example, may be ensuring that each of the wearable heads up displays is operational and fully charged so that it can be used when a customer arrives at the retail location. Other issues may arise with keeping track of each of the large number of heads up displays to make sure that the heads up displays are not misplaced or stolen.

BRIEF SUMMARY

An interactive visual display may be used to simulate various types of experiences that users may have with a wearable heads up display. In some implementations, a plurality of interactive visual displays may be arranged within the floor space of a retail establishment to provide a visually striking and engaging installation to attract customers into the retail establishment.

An interactive visual display for a user who has a communication device may be summarized as including a display panel, the display panel which is transparent and has a front face and an opposing back face, the front face and the back face which are separated by a width, the front face which is oriented to be disposed between a first area and a second area, the display panel which includes a display zone that conveys an image towards the first area; and a visual source, the visual source which generates the image conveyed by the display zone of the display panel, the visual source which generates the conveyed image based at least in part on a text message received from the communication device of the user.

The visual display may further include a controller, the controller which receives the text message from the user and determines the image to be conveyed to the first area based at least in part on the received text message. The conveyed image may be based at least in part on at least one of a condition or an object present in the second area. The display panel may be offset by a distance from a surface, and the offset distance may be selectively adjustable. The display panel may be arranged at an angle to a horizontal surface, wherein the angle is selectively adjustable. The visual source may be a projector. The visual source may include a plurality of pixel elements that are contained in the display panel.

The image conveyed by the visual source may include at least a portion of a pair of glasses, wherein the at least portion of the pair of glasses includes a message area, the message area displaying visual information. The visual information may be based at least in part on the text message received from the communication device of the user. The visual information may be based at least in part on one or more environmental conditions in an environment proximate the interactive visual display.

The visual display may further include an imager that captures one or more images from at least one of the first area or the second area, wherein the visual information displayed in the message area is based at least in part on the one or more images captured by the imager.

A visual display system may be summarized as including a display floor; and at least three visual displays arranged within the display floor, each visual display to form displays for a respective user who has an associated communications device, the visual display including a display panel, the display panel which is transparent and has a front face and an opposing back face, the front face and the back face which are separated by a width, the front face which is oriented to be disposed between a first area and a second area, the display panel which includes a display zone that conveys an image towards the first area; and a visual source, the visual source which generates the image conveyed by the display zone of the display panel, the visual source which generates the conveyed image based at least in part on a text message received from the associated communication device of the respective user.

The visual display system may further include a controller, the controller which is communicatively coupled to a plurality of the at least three visual displays, the controller which determines the image to be conveyed to each respective first area for each respective one of the plurality of the at least three visual displays based at least in part on the text message receive from the associated communication device of the respective user. The controller may be located remotely from each of the plurality of the at least three visual displays. The first area for at least one of the at least three visual displays may overlap at least in part with the second area for at least one other of the at least three visual displays. The display panels for the at least three visual displays may each have a display panel height and a display panel width, and the respective display panel height for one of the at least three visual displays may be different from the respective display panel heights for at least one other of the at least three visual displays. At least one of the display panels may be selectively rotatable about at least one of a vertical axis of rotation and a horizontal axis of rotation.

The display floor may include a plurality of docks, each of the plurality of docks sized and dimensioned to receive one of the at least three visual displays.

The display floor may include a number of docks, the number of docks exceeding a total number of visual displays arranged on the display floor.

A interactive visual display for a user who has a communication device may, be summarized as including a display panel, the display panel which is transparent and has a front face and an opposing back face, the front face and the back face which are separated by a width, the front face which is oriented to be disposed between a first area and a second area, the display panel which includes a display zone that conveys an image towards the first area; a support member, the support member which maintains the display panel in a defined position; and a visual source, the visual source which generates the image conveyed by the display zone of the display panel, the visual source which generates the conveyed image based at least in part on a text message received from the communication device of the user.

Maintaining the display panel in a defined position may further include maintaining the display panel at an angle such that the front face is tilted at an angle of 45 degrees or less from a vertical position.

The interactive visual display may further include an anchor, the anchor which has a first end and an opposing second end, the anchor which is physically coupled to the support member at the first end and which is physically coupled to a support surface at the opposing second end. The support surface may include at least one of a floor, a wall, and a ceiling. At least one of the display panels may be selectively rotatable about at least one of a vertical axis of rotation and a horizontal axis of rotation.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 40 is a front view (from the user's point of view) of a visual display presenting a text message conversation screen in accordance with the present systems, devices, and methods.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices, head-worn devices, displays or screens, projectors, and computers, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for wearable heads-up displays that are transparent. The wearable heads-up displays described herein are significantly less bulky and less massive than other wearable heads-up displays available today.

A person of skill in the art will appreciate that, in general, one or more reflective element(s) may be replaced by one or more refractive element(s) and/or one or more diffractive element(s), and vice versa, with some re-alignment of the optical path sometimes necessary, to achieve the same final end trajectory of a light signal.

Figure 1:
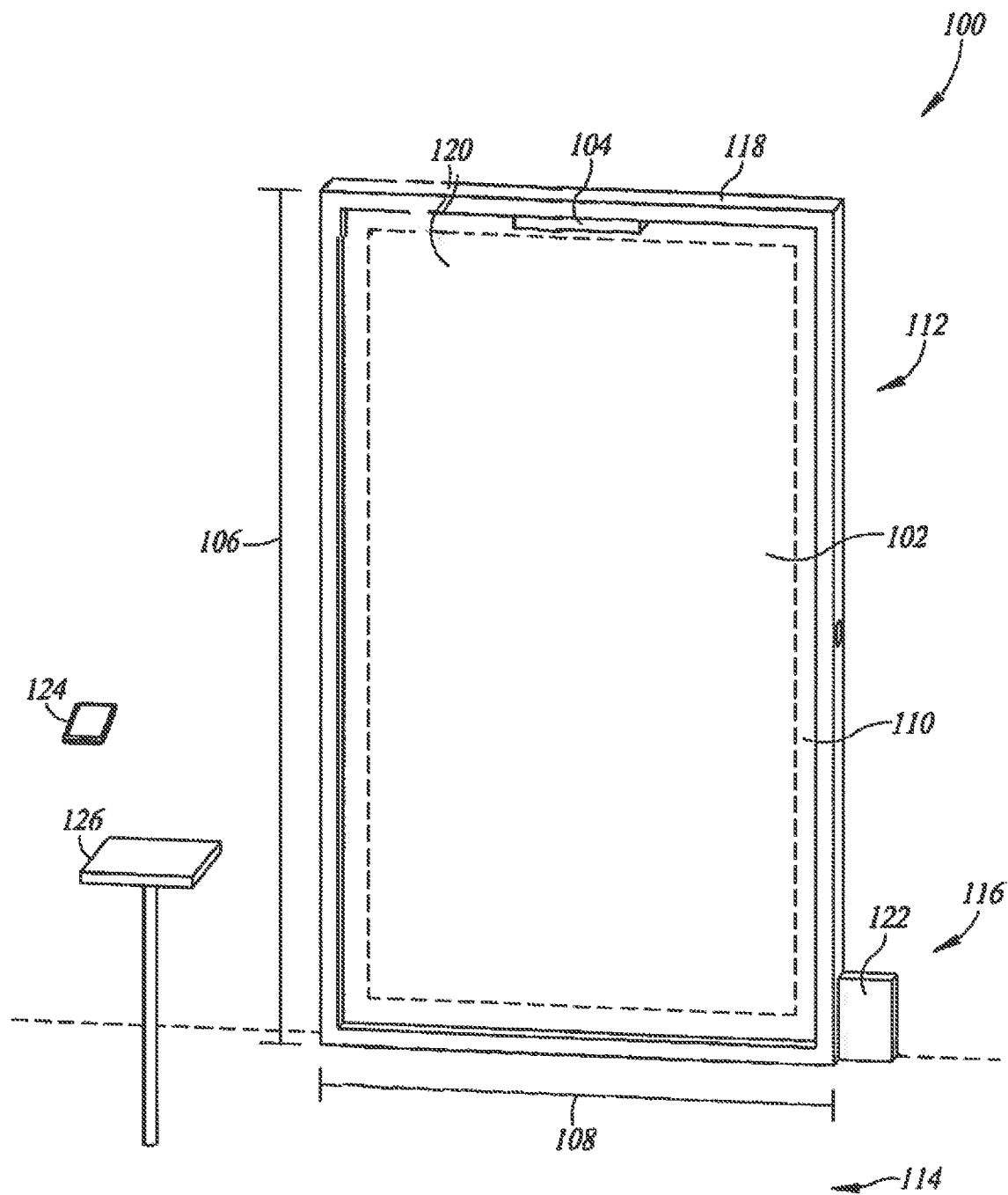
FIG. 1 is an isometric view of an environment, for example a retail environment, that includes a visual display panel and a user input kiosk, and in which a communications device may be present, in accordance with the present systems, devices, and methods.

FIG. 1 shows an environment (e.g., retail environment) including a visual display system 100 in accordance with the present systems, devices, and methods. The visual display system 100 includes a display panel 102 and a visual source 104. The display panel 102 may have a height 106 and a length 108, along with a first face 110 and a second face 112, separated by a width (not shown). In some implementations, the first face 110 and/or second face 112 of the display panel may be oriented to intersect a horizontal surface (e.g., a floor or the ground) substantially perpendicularly. In some implementations, the first face 110 and/or the second face 112 may be oriented to intersect the horizontal surface at an angle, such that the first face 110 may be tilted, for example, to face downward towards the ground or upwards towards a ceiling. The first face 110 may face out towards a first area 114, and the second face 112 may face out towards a second area 116. In some implementations, the first face 110 and/or the second face 112 may have a shape other than a rectangle. In some implementations, for example, the first face 110 and/or the second face 112 may be shaped as a circle or an oval, or may have a shape that approximates the shape of an object (e.g., a lens in a pair of glasses).

In some implementations, the visual display system 100 may include a frame 116 that extends around at least a portion of the display panel 102. In some implementations, for example, the frame 118 may extend entirely or partially around a perimeter of the display panel 102. In some implementations, the display panel 102 may be attached to the frame 118 along some or all of the height 106 and/or length 108 of the display panel 102. In some implementations, the display panel 102 may be attached to the frame 118 only at certain discrete points. In such implementations, the display panel 102 may rotate about the discrete points to thereby change the orientation of the first face 110 and/or second face 112 of the display panel with respect to the frame 118. In some implementations, the frame 118 and/or the display panel 102 may be freestanding. In such implementations, the visual display system 100 may be maintained within a substantially upright position when set upon a horizontal surface. In such implementations, the visual display system 100 may be anchored, docked, and/or otherwise physically coupled to the horizontal surface to add further stability. Such further stability may be advantageous, for example, when the visual display system 100 is placed in a display or retail environment in which people may accidentally, or intentionally, push or run into the visual display system 100.

The display panel 102 may be comprised of one or more types of transparent materials. In some implementations, the display panel 102 may be comprised of one or more of glass, plastics, and/or other types of composite materials. In some implementations, the display panel 102 may include a coating or other material that at least partially obscures images of objects on the opposing side of the display panel. In some implementations, the display panel 102 may include a display zone 120 that is used to convey images to either or both of the first area 114 and/or the second area 116. In some implementations, the display zone 120 may include one or optical elements (e.g., lenses, reflectors, beam splitter, or the like) that may be used to direct one or more light signals in a defined direction. In some implementations, the display zone 120 may incorporate one or more light generating elements, such as a set of organic light emitting diode (OLED) elements, liquid crystal display (LCD), liquid crystal on silicon (LCoS), digital micro-mirrors (DMD), or other like technology. In some implementations, the display zone 120 may include all or substantially all of the first face 110 and/or the second face 112 of the display panel 102. In some implementations, the display zone 120 may include only a sub-part of the first face 110 and/or the second face 112 of the display panel 102.

The optical elements and/or light generating elements may be used to convey light signals out of either or both of the display zones 120 of the first face 110 and/or the second face 112. Such light signals may be used to project images to one or more of the first area 114 and/or the second area 116. In some implementations, the images may be projected to a specific location within the first area 114 and/or the second area 116. In such implementations, a user may need to be located at the specific location to view the projected images. In same implementations, the projected images may appear to be overlaid with objects located on the other side of the display panel 102 when viewed by a user. For example, a user positioned within the first area 114 may look through the transparent display panel 102 and see objects located within the second area 116, as discussed above. When the display panel 102 projects images towards the first area 114 via the conveyed light signals, such projected images may appear to the user to be overlaid on the objects visible within the second area 116.

The visual source 104 may be used to generate the images to be conveyed via the display zones 120. In some implementations, such visual sources may include, for example, projector units and/or LED displays that may be used to generate light signals that are reflected off of optical elements within the display zone 120 (see, e.g., FIG. 2). In such an implementation, the visual source 104 may be physically separated from the display panel 102. In such an implementation, at least a portion of the light path from the visual source 104 to the display panel 102 may be through the air in one or both of the first area 114 and the second area 116. In some implementations, the visual source 104 may be optically coupled to an optical element within the display zone 102 of the display panel 102, via, for example, an optical path. In such an implementation, the visual source 104 may generate a light signal of a defined wavelength, and such light signal may travel through the optical path to be conveyed via the optical element in the display zone 120. In some implementations, the visual source 104 may generate one or more electrical signals that are conveyed to light emitting elements that are incorporated into the display panel 102 (using, e.g., OLED, LCD, LCoS, DMD, or like technology). In such implementations, the visual source 104 may be electrically coupled to the light emitting elements, and may transmit an electrical signal to energize and/or activate the light emitting element. In some implementations, the visual source 104 may be a display that may be selectively illuminated to form a Pepper's Ghost-type of projection on the display zone 120.

The images conveyed by the display panel 102 may be controlled by a controller 122. The controller 122 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. The controller 122 may be communicatively coupled to the visual source 104. As such, the controller 122 may generate and transmit one or more signals to the visual source 104 to thereby control the images generated by the visual source. In some implementations, the controller 122 may be located proximate the visual display system 100. In some implementations, the controller 122 may be located away from the visual display system 100.

The controller 122 may determine the images to be conveyed by the display panel 102 based in part upon communications received from a communication device 124 (e.g., smartphone) of a user (as discussed below). Such communications from the communication device 124 may include, for example, text messages and/or voice messages transmitted from the communication device 124. Such communications may be transmitted from the communication device 124 to the controller 122 via a wireless communications network. In some implementations, the controller 122 may determine the images to be conveyed by the display panel 102 based upon signals and/or communications received from a user input kiosk 126. Such a user input kiosk 126 may be positioned, for example, within the first area 114 proximate a location at which the image conveyed by the display panel 102 will be displayed. In some implementations, the user input kiosk 126 may be communicatively coupled to the controller 122 via a wired and/or a wireless communications connection. Such wireless communications connections may include, for example, Wi-Fi, Ethernet, Bluetooth, ZigBee or any other acceptable communication protocol. In some implementations, the controller 122 may determine the images to be conveyed by the display panel 102 based in part upon conditions within the environment surrounding the display panel 102. In some implementations, the controller 122 may determine the images to be conveyed by the display panel 102 based in part upon conditions within, for example, the first area 114 and/or the second area 116.

The user input kiosk 126 may be fixed or moveable within the first area 114, and is a persistent part of the environment (e.g., retail store), typically owned by the same entity that owns the display system 100. In contrast, the communication device 124 (e.g., smartphone) of the user is moveable and not a persistent part of the environment (e.g., retail store), typically owned by a different entity (e.g., potential customer or customer) than the entity that owns the display system 100.

In some implementations, the controller 122 may receive one or more signals from a motion and/or presence detector 128 that may be indicative detect motion by and/or determine the presence of a customer within a defined zone. Once motion by and/or presence of a potential customer is determined, the controller 122 may transmit one or more signals to the visual source 104 to thereby control the images generated by the visual source 104. In such implementations, the images generated by the visual source may be "canned," such that the images generated do not depend upon any further interaction with the customer.

In some implementations, the controller 122 may transmit one or more signals to the visual source 104 to thereby control the images generated by the visual source 104 without receiving any communications and/or interacting with any customer. In such an implementation, the controller 122 may transmit one or more signals to the visual source 104 causing an image and/or a series of images to be conveyed by the display panel 102. In some implementations, the controller 122 may cause the visual source 104 to continuously repeat a series of images. In some implementations, the controller 122 may cause the visual source 104 to display random images and/or random series of images.

Figure 2:
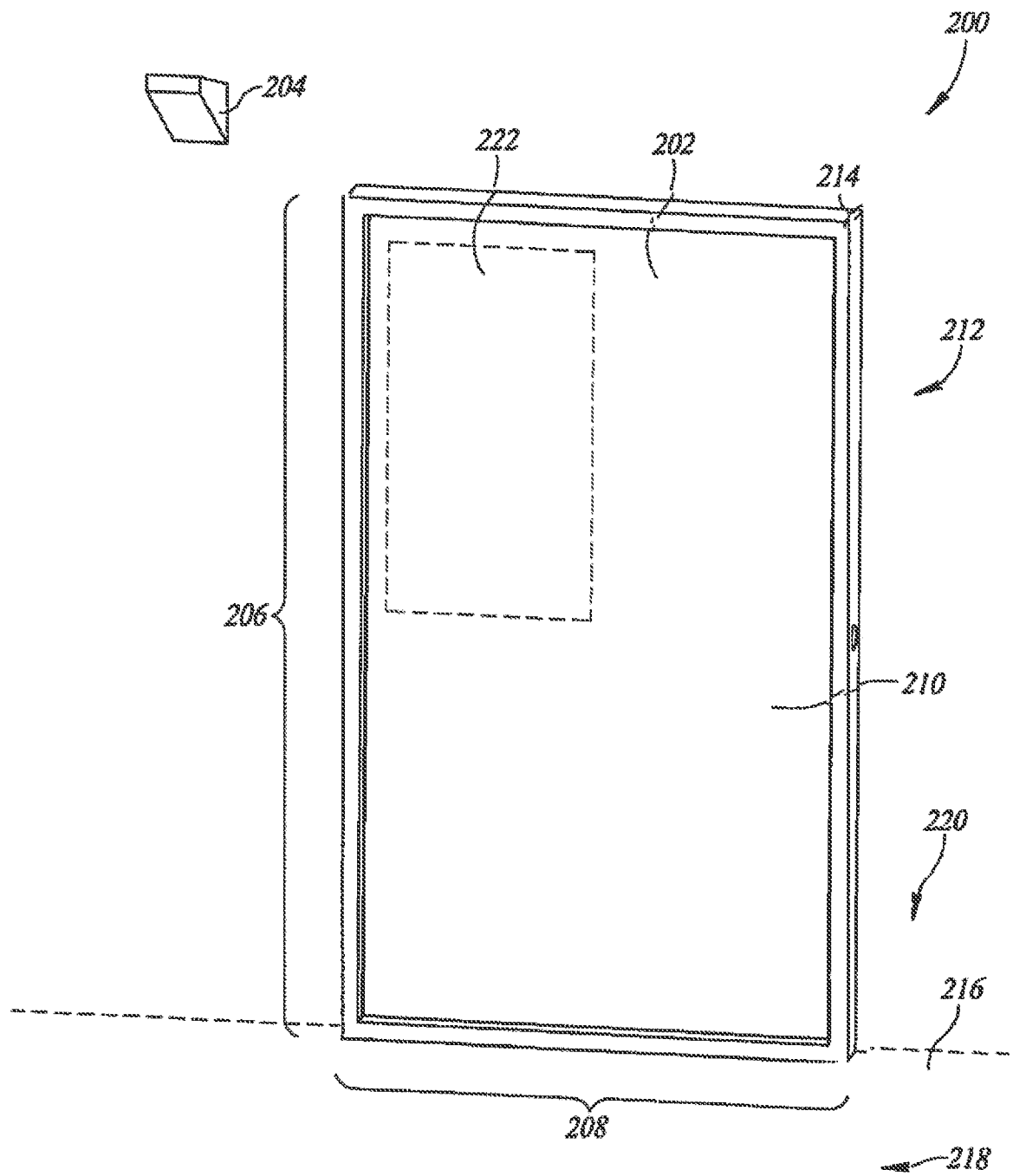
FIG. 2 an isometric view of a visual display that includes a display panel and a projector in accordance with the present systems, devices, and methods.

FIG. 2 a type of visual display system 200 that includes a display panel 202 and a projector 204 in accordance with the present systems, devices, and methods. The display panel 202 may have a height 206 and a length 208, along with a first face 210 and a second face 212, separated by a width 214. In some implementations, the first face 210 and/or second face 212 of the display panel may be oriented to intersect a horizontal surface 216 (e.g., a floor or the ground) substantially perpendicularly. In some implementations, the first face 210 and/or the second face 212 may be oriented to intersect the horizontal surface 216 at an angle, such that the first face 210 may be tilted, for example, to face downward towards the ground or upwards towards a ceiling. The first face 210 may face out towards a first area 218, and the second face 212 may face out towards a second area 220.

The display panel 202 may be comprised of one or more types of transparent materials. In some implementations, the display panel 202 may be comprised of one or more of glass, plastics, and/or other types of composite materials. In some implementations, the display panel 202 may include a coating or other material that at least partially obscures images of objects on the opposing side of the display panel. In some implementations, the display panel 202 may include a display zone 222 that is used to convey images to either or both of the first area 218 and/or the second area 220. In some implementations, the display zone 222 may include one or optical elements (e.g., lenses, reflectors, beam splitter, or the like) that may be used to direct one or more light signals in a defined direction. In some implementations, such as that shown in FIG. 2, the display zone 222 may include only a sub-part of the first face 210 and/or the second face 212 of the display panel 202. In some implementations (see, e.g., FIG. 1), the display zone 222 may include all or substantially all of the first face 210 and/or the second face 212 of the display panel 202.

The projector 204 may include one or more light sources that generate light signals. For example, in some implementations, the projector 204 may include three light sources that each generates a light signal at a defined wavelength. Such light signals may be combined to form a color image. The one or more light sources may direct the light signals along an optical path towards the display zone 222 in the display panel 202. The light signals may be directed by optical elements within the display zone towards one or both of the first area 218 and/or the second area 220 to thereby project images towards the respective first area 218 and/or second area 220.

Figure 3A:
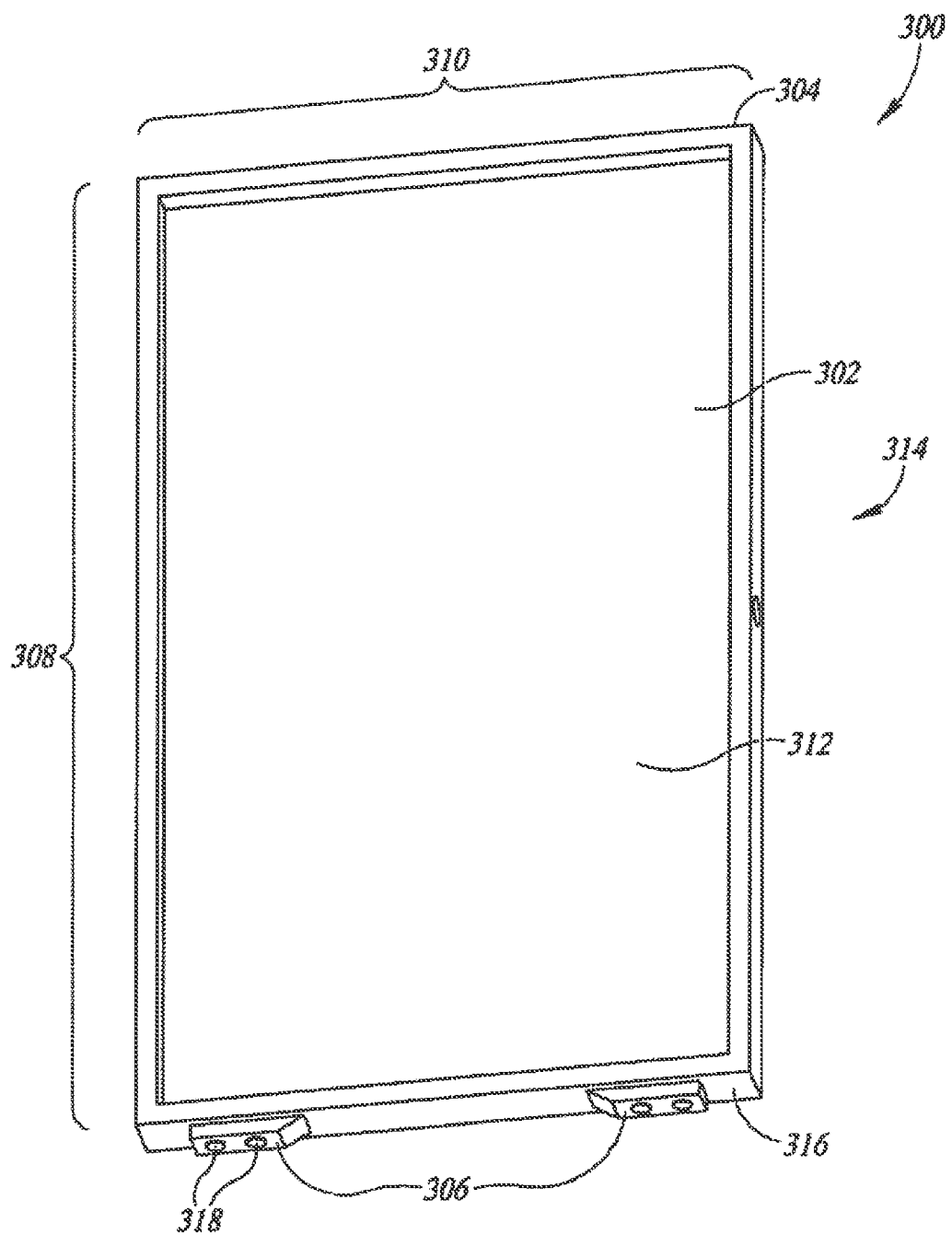
FIG. 3A is an isometric view of a visual display with a display panel, a frame, and a plurality of docking posts in accordance with the present systems, devices, and methods.

FIG. 3A shows a type of visual display system 300 with a display panel 302, a frame 304, and a plurality of docking posts 306 in accordance with the present systems, devices, and methods. The display panel 302 may have a height 308 and a length 310, along with a first face 312 and a second face 314, separated by a width (not shown). In some implementations, the first face 312 and/or second face 314 of the display panel may be oriented to intersect a horizontal surface (e.g., a floor or the ground) substantially perpendicularly. The display panel 302 may be comprised of one or more types of transparent materials. In some implementations, the display panel 302 may be comprised of one or more of glass, plastics, and/or other types of composite materials. In some implementations, the display panel 302 may include a coating or other material that at least partially obscures images of objects on the opposing side of the display panel. In some implementations, the display panel 302 may include one or optical elements (e.g., lenses, reflectors, beam splitter, or the like) that may be used to direct one or more light signals in a defined direction. In some implementations, the display panel 302 may incorporate one or more light generating elements, such as a set of organic light emitting diode (OLED) elements, liquid crystal display (LCD), liquid crystal on silicon (LCoS), digital micro-mirrors (DMD), or other like technology. Such optical elements and/or light generating elements may be used to convey images from the display panel 302, as discussed above.

The frame 304 may extend around at least a portion of the display panel 302. In some implementations, for example, the frame 304 may extend entirely or partially around a perimeter of the display panel. In some implementations, the display panel 302 may be attached to the frame 304 along some or all of the height 308 and/or length 310 of the display panel 302. In some implementations, the display panel 302 may be attached to the frame 304 only at certain discrete points, as discussed above.

As shown in FIG. 3A, the frame 304 may have a bottom portion 316 that runs along the length 310 of the display panel 302. The bottom portion 316 may include one or more docking posts 306 that may be sized and shaped to be received by a corresponding dock. Such a dock may be included, for example, in a horizontal surface upon which the visual display system 300 is to be set, such as, for example, a floor, a shelf, or the ground. In some implementations, each docking post 306 may be received by a corresponding dock to thereby maintain the visual display system 300 in an upright position. In such a position, the first face 312 and/or the second face 314 may intersect the horizontal surface at a right angle. In some implementations, the docking posts 306 may include a mechanical coupler (e.g., a latch, hook, or the like) that may selectively, releasably, physically couple with a complementary mechanical coupler contained within the dock on the horizontal surface to thereby selectively, releasably, physically couple the visual display system 300 to the horizontal surface. In some implementations, the docking posts 306 may include one or more electrical connectors or couplers 316 that may be electrically coupled to a complementary electrical connector or coupler contained within the dock. As such, the corresponding electrical couplers may be used to provide an electrical and/or communicative coupling to the visual display system 300.

In some implementations, the visual display system 300 may be selectively moved between different docks within a display floor and/or between different docks on different display floors. In such implementations, the visual display system 300 may be moved to different positions within the display floor and thereby used to create different displays and/or effects. In some implementations, a plurality of visual displays may be moved between different sets of docks to create a selectively configurable layout of visual display systems 300 on the display floor that may be easily and quickly changed and modified to create different types of environments, effects, and/or displays.

Figure 3B:
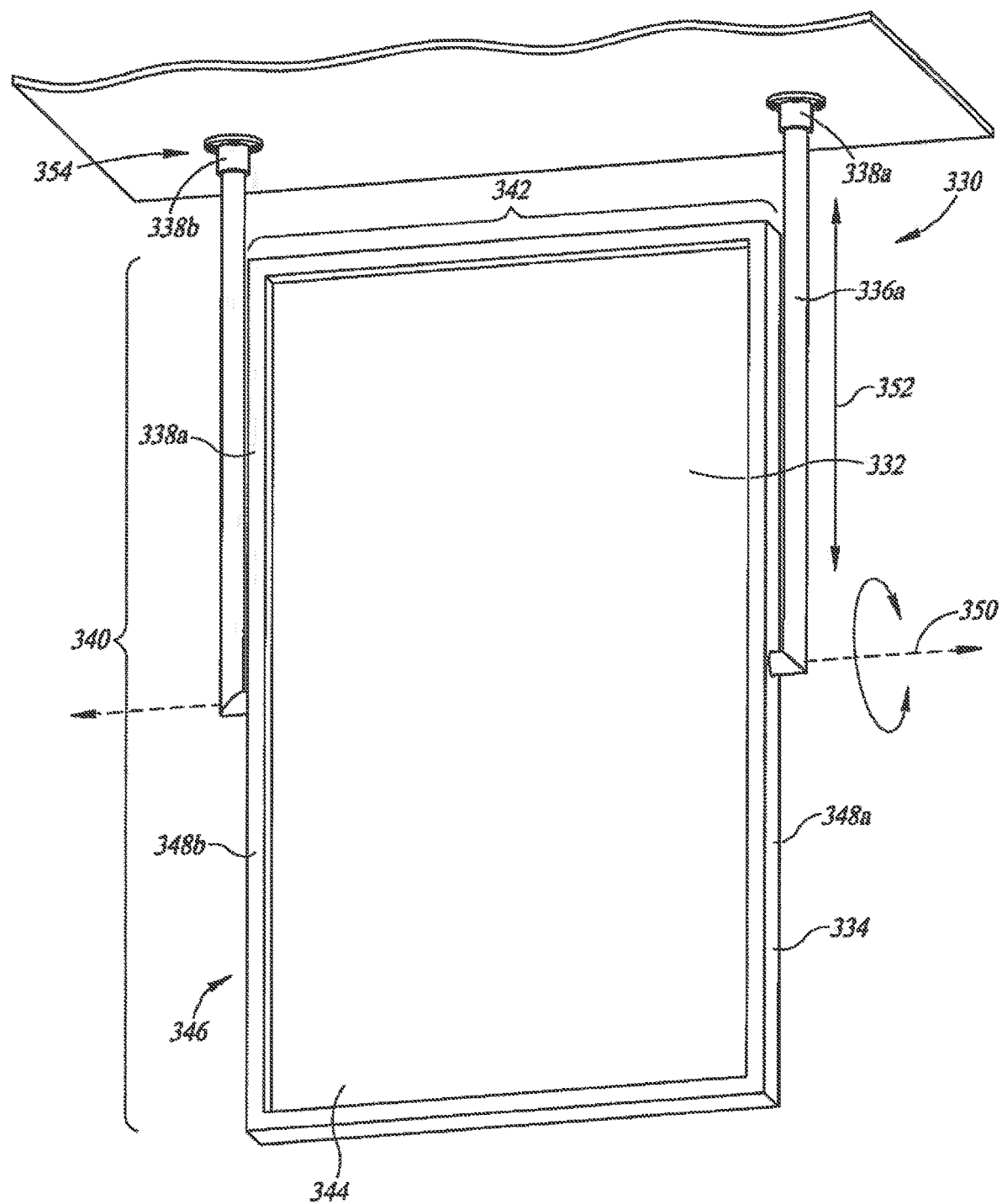
FIG. 3B is an isometric view of a visual display with display panel, a frame, and a plurality of support members each with an associated anchor in accordance with the present systems, devices, and methods.

FIG. 3B shows a type of visual display system 330 with a display panel 332, a frame 334, and a plurality of support members 336a, 336b each with an associated anchor 338a, 338b in accordance with the present systems, devices, and methods. The display panel 330 may have a height 340 and a length 342, along with a first face 344 and a second face 346, separated by a width (not shown). The display panel 332 may be comprised of one or more types of transparent materials. In some implementations, the display panel 332 may be comprised of one or more of glass, plastics, and/or other types of composite materials. In some implementations, the display panel 332 may include a coating or other material that at least partially obscures images of objects on the opposing side of the display panel. In some implementations, the display panel 332 may include one or optical elements (e.g., lenses, reflectors, beam splitter, or the like) that may be used to direct one or more light signals in a defined direction. In some implementations, the display panel 332 may incorporate one or more light generating elements, such as a set of organic light emitting diode (OLED) elements, liquid crystal display (LCD), liquid crystal on silicon (LCoS), digital micro-mirrors (DMD), or other like technology. Such optical elements and/or light generating elements may be used to convey images from the display panel 332, as discussed above.

The frame 334 may extend around at least a portion of the display panel 332. In some implementations, for example, the frame 334 may extend entirely or partially around a perimeter of the display panel 332. In some implementations, the display panel 332 may be attached to the frame 334 along some or all of the height 340 and/or length 342 of the display panel 332. In some implementations, the display panel 332 may be attached to the frame 334 only at certain discrete points, as discussed above.

As shown in FIG. 3B, the frame 334 may have two opposing side portions 348a, 348b that each run along the height 340 of the display panel 332. The two opposing side portions 348a, 348b may be comprised of substantially rigid material, such as plastics or composite materials, that may be used to protect the display panel 332. Each of the two opposing side portions 348a, 348b may be physically coupled to one of the support members 336a, 336b, respectively, at a point or at a portion along the frame 334 (e.g., mid-way along the height 340). In some implementations, the locations at which the support members 336a, 336b physically couple to the frame 334 may form a horizontal axis of rotation 350 for the display panel 332 and/or frame 334. As shown in FIG. 38, for example, the axis of rotation 350 may extend substantially parallel to the length 342 of the display panel 332. The display panel 332 may be rotated around the horizontal axis of rotation 350 to thereby change the orientation of the first face 344 and/or second face 346 of the display panel 332.

The support members 336a, 336b may extend along a length 352 between the frame 334 and the respective anchors 338a, 338b. In some implementations, the support members 336a, 336b may be selectively extendable and/or collapsible along the length 352, which may be used to selectively vary a distance between the visual display system 330 and a lower horizontal surface (e.g., the floor). The anchors 338a, 338b may be physically coupled and secured to a support surface 354. As shown in FIG. 3B, the support surface 354 may be a ceiling such that the visual display system 330 is suspended from the ceiling. In other implementations, the support surface 354 may be a floor and/or one or more walls. The anchors 338a, 338b may be secured to the support surface 352 using one or more of nuts, bolts, screws, rivets, or other like connectors. In some implementations, the anchors 338a, 338b may be selectively, releasably secured to the support surface 354 using, for example, one or more of a latch, pin, post, or other like coupler that may be selectively, operably locked or released. In some implementations, one or both of the anchors 338a, 338b may include one or more electrical connectors (not shown) that may electrically and/or communicatively couple with a complementary electrical connector contained with the support surface 354.

Figure 3C:
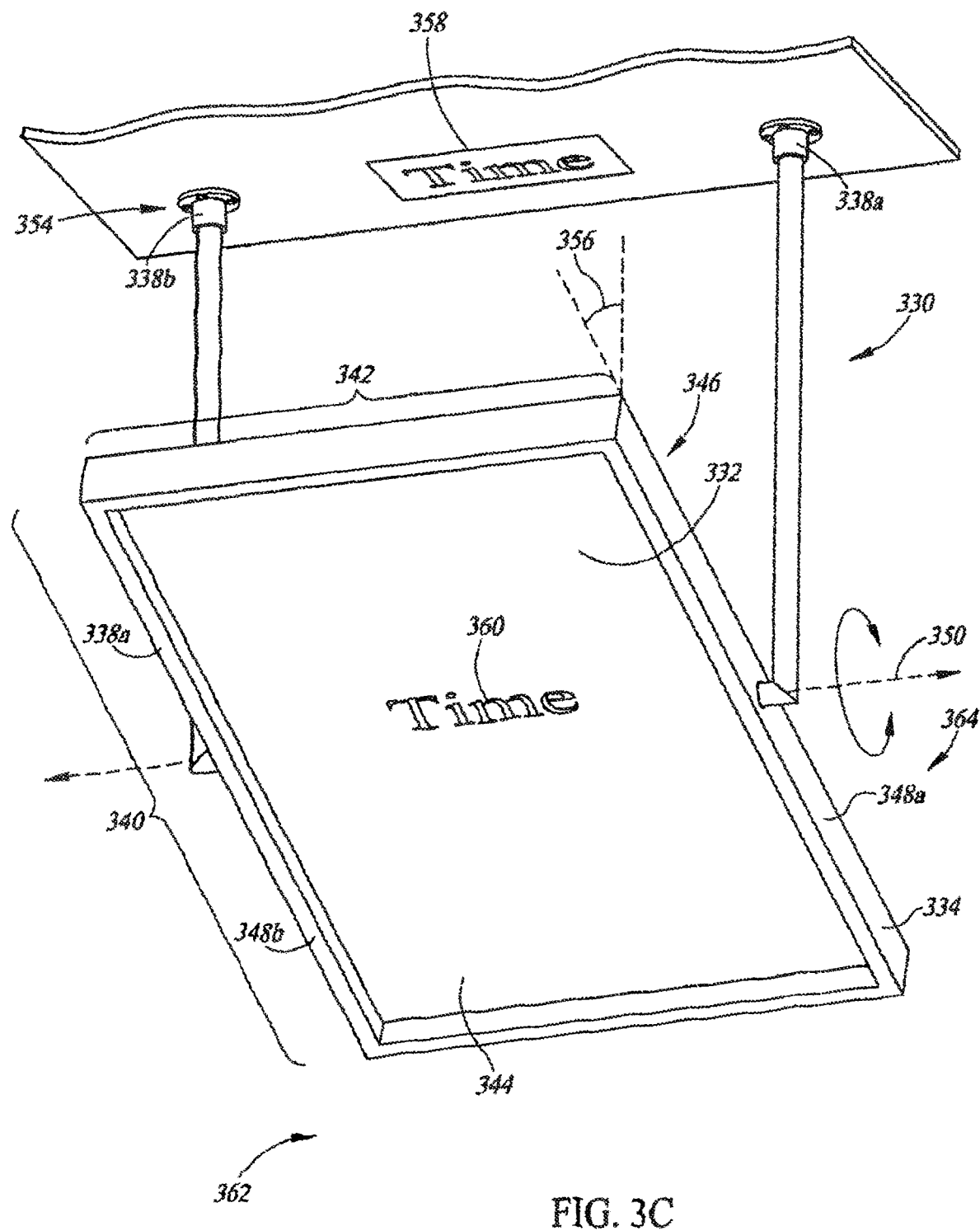
FIG. 3C is an isometric view of a visual display with the display panel arranged at an angle with respect to a vertical position, a frame, and a plurality of support members each with an associated anchor in accordance with the present systems, devices, and methods.

FIG. 3C show the visual display system 330 with the display panel 332 arranged at a defined angle 356 with respect to a vertical position, a frame 334, and a plurality of support members 336a, 336b each with an associated anchor 338a, 338b in accordance with the present systems, devices, and methods. In such an implementation, the visual display system 330 may include a visual source 358 that is mounted and/or incorporated into the support surface 354. As such, the defined angle 356 may be an angle at which an image projected from the visual source 358 is conveyed as an image 360 projected from the first surface 344 towards a first area 362. For example, the defined angle 356 may be between 30° and 60° from a vertical orientation for the display panel 332. In some implementations, the defined angle 358 may be selectively adjusted by rotating the display panel 332 along the horizontal axis of rotation 350.

In some implementations, the visual display system 330 may be used to present a Pepper's Ghost display via the display panel 332. In such implementations, the visual source 358 may include a three-dimensional environment that is similar to or based on the three-dimensional environment within a second area 364 that is on the opposite side of the display panel 332 than the first area 362. As such, the three-dimensional environment within the visual source 358 may be selectively illuminated to project the three-dimensional display towards the display panel 332 where it is thereby conveyed out of the first surface 344 towards the first area 362. In some implementations, the visual source 358 may include an electronic (e.g., digital) display that is projected from the support surface 354 towards the display panel 332 such that the associated image 360 is conveyed from the first surface 344 towards the first area 362. For example, as shown in FIG. 3C, the visual source 358 may be used to display a "Time" indication that is projected towards the display panel 332 and thereby conveyed towards the first area 362.

Figure 3D:
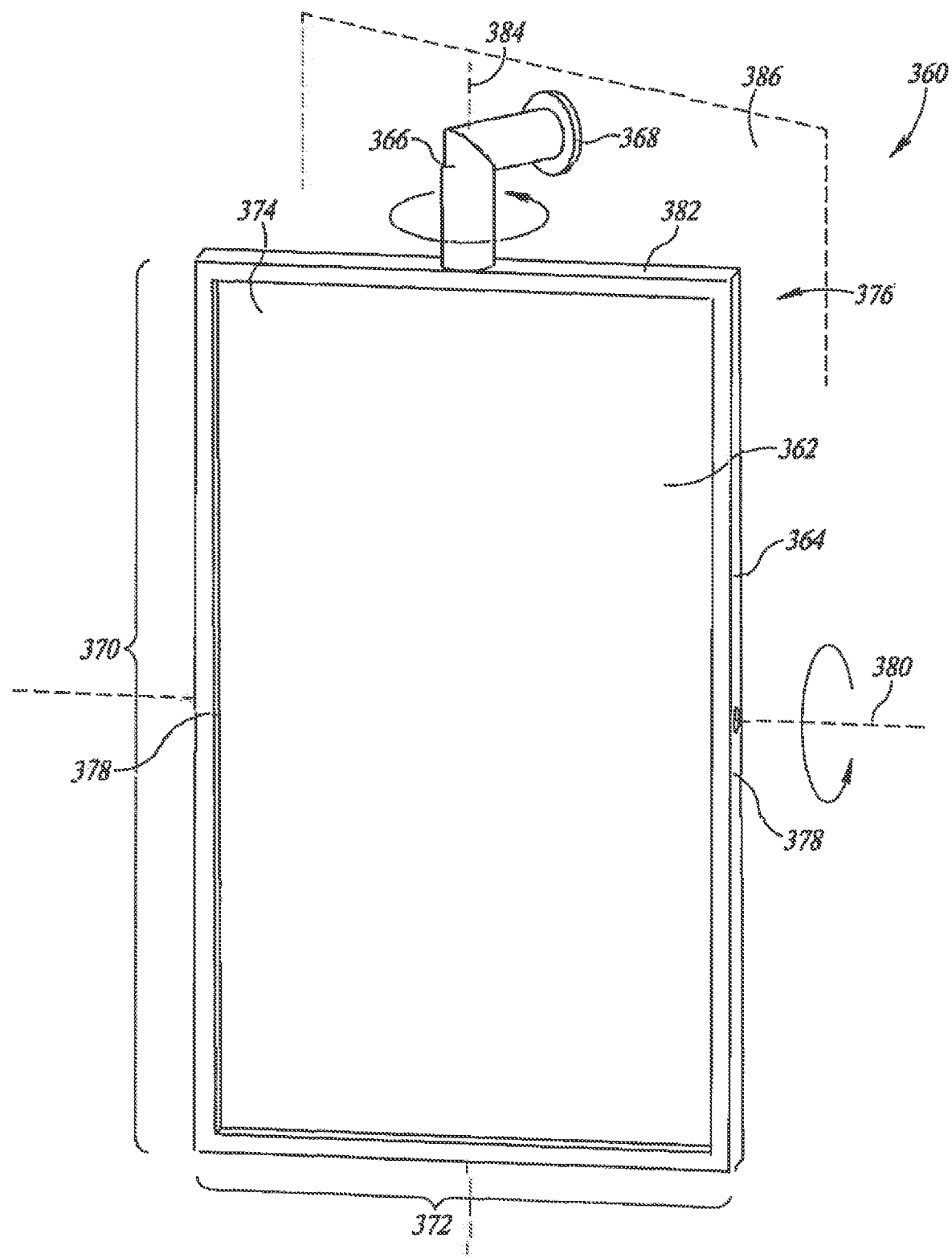
FIG. 3D is an isometric view of a visual display with a display panel, a frame, and a support member and associated anchor in accordance with the present systems, devices, and methods.

FIG. 3D shows a type of visual display system 360 with a display panel 362, a frame 364, and a support member 366 with an associated anchor 368 in accordance with the present systems, devices, and methods. In such an implementation, one or more elements (e.g., the display panel 362, the frame 364, and/or a visual source) may be suspended from a wall or ceiling. The display panel 360 may have a height 370 and a length 372, along with a first face 374 and a second face 376, separated by a width (not shown). The display panel 362 may be comprised of one or more types of transparent materials. In some implementations, the display panel 362 may be comprised of one or more of glass, plastics, and/or other types of composite materials. In some implementations, the display panel 362 may include a coating or other material that at least partially obscures images of objects on the opposing side of the display panel. In some implementations, the display panel 362 may include one or optical elements (e.g., lenses, reflectors, beam splitter, or the like) that may be used to direct one or more light signals in a defined direction. In some implementations, the display panel 362 may incorporate one or more light generating elements, such as a set of organic light emitting diode (©LED) elements, liquid crystal display (LCD), liquid crystal on silicon (LCoS), digital micro-mirrors (DMD), or other like technology. Such optical elements and/or light generating elements may be used to convey images from the display panel 362, as discussed above.

The frame 364 may extend around at least a portion of the display panel 362. In some implementations, for example, the frame 364 may extend entirely or partially around a perimeter of the display panel 362. In some implementations, the display panel 362 may be attached to the frame 364 along some or all of the height 370 and/or length 372 of the display panel 362. In some implementations, the display panel 362 may be attached to the frame 334 only at certain discrete points. For example, as shown in FIG. 3D, the display panel 362 may be physically coupled to the frame 364 at two locations 378 along the height 370 of the display panel 362. As such, the two locations 378 may thereby form a horizontal axis of rotation 380 around which the display panel 362 may rotate. As such, the orientation of the first face 374 and/or the second face 376 may be changed with respect to the floor, ground, or other horizontal surface. Such rotation may be advantageous, for example, for visual display systems 360 that are mounted in an elevated position above people on a display floor. In such a situation, the display panel 360 may be rotated so that one of the first face 374 or the second face 376 is tilted downward towards the display floor, and may thereby be more visible to the people on the display floor.

As shown in FIG. 3D, the frame 364 may have a top portion 382 that runs along the length 372 proximate a top edge of the display panel 362. The top portion 382 may be comprised of substantially rigid material, such as plastics or composite materials, that may be used to protect the display panel 362. The top portion 382 may be physically coupled to the support member 366 at a point or at a portion on the frame 364 (e.g., mid-way along the length 372). In some implementations, the location at which the support member 366 physically couples to the frame 364 may form a vertical axis of rotation 384 for the display panel 362 and/or frame 364. As shown in FIG. 3D, for example, the vertical axis of rotation 384 may extend substantially parallel to the height 370 of the display panel 362. The display panel 362 may thereby rotate around the horizontal axis of rotation 380 and/or the vertical axis of rotation 384 to thereby change the orientation of the first Face 344 and/or second face 346 of the display panel 362.

The support member 366 may extend between the frame 364 and one or more anchors 368. The anchor(s) 368 may be physically coupled and secured to a support surface 386. As shown in FIG. 3D, the support surface 386 may be a wall such that the visual display system 360 is suspended from the wall. In other implementations, the support surface 386 may be a floor and/or a ceiling. The anchor(s) 368 may be secured to the support surface 386 using one or more of nuts, bolts, screws, rivets, or other like connectors. In some implementations, the anchor(s) 368 may be selectively, releasably secured to the support surface 386 using, for example, one or more of a latch, pin, post, or other like coupler that may be selectively, operably locked or released. In some implementations, the anchor(s) 368 may include one or more electrical connectors (not shown) that may electrically and/or communicatively couple with a complementary electrical connector contained with the support surface 386.

Figure 4A:
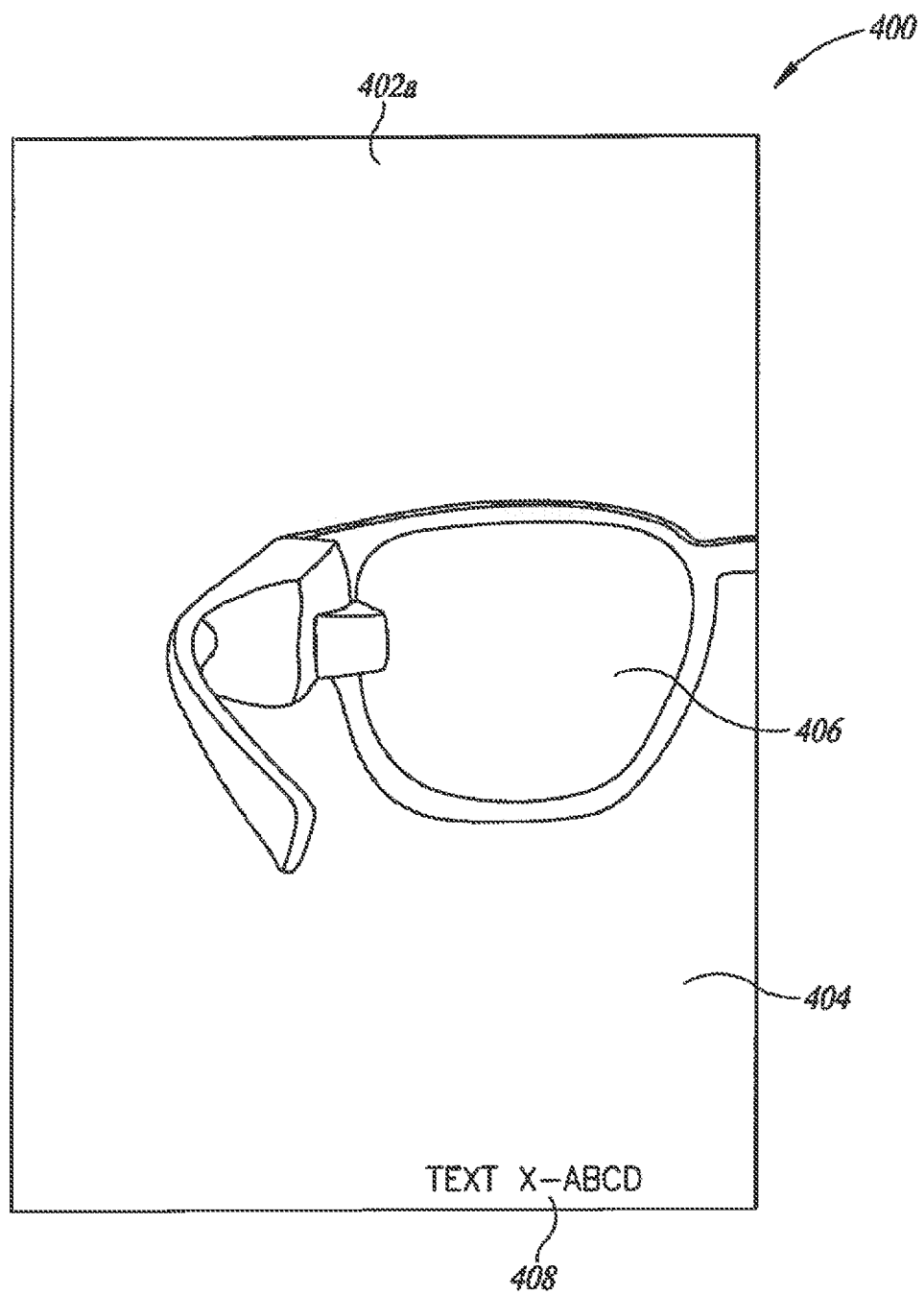
FIG. 4A is a front view (from the user's point of view) of a visual display presenting a welcome screen in an interactive presentation in accordance with the present systems, devices, and methods.

FIGS. 4A through 4O show front views (from the user's point of view) of a visual display 400 that conveys different images 402a, 402b, 402c, and 402d (generally, "images 402") via a display panel 404 to provide various interactive presentations in accordance with the present systems, devices, and methods. The display panel 404 may convey the images 402 towards a first area (e.g., first area 114), where one or more users may be present. In some implementations, the images 402 may be conveyed by light generating elements included within the display panel 404. In some implementations, the images 402 may be conveyed by one or more optical elements that may reflect the images 402 towards the first area. The display panel 404 may be transparent such that items present on the side of the display panel 404 opposite the first area may be visible to the one or more users from the first area.

In some implementations, the visual display 400 may be included as part of a retail display. For example, the visual display 400 may be included as part of a display in a retail establishment or a convention exhibit. In such implementations, the display panel 404 may provide a retail experience related to one or more types of products that may be for sale. For example, in some implementations, the display panel 404 may display images 402 that include at least a part of a pair of glasses 406. Such glasses 406 may be related to physical glasses being sold or vended in connection with the retail display. In some implementations, the physical glasses may have augmented reality and/or virtual reality capabilities. In some implementations, such augmented reality and/or virtual reality capabilities may be interactive, and may thereby convey images based upon actions or responses from the user, and/or information from the environment surrounding the physical glasses. The display panel 404 may be used to emulate or show the augmented reality and/or virtual reality capabilities of the physical glasses using the glasses 406 conveyed by the display panel 404.

As shown in FIG. 4A, the display panel 404 may include a welcome or starting image 402a. In some implementations, the starting image 402a may display a welcome image or a welcome movie that may be used to show at least some of the capabilities of the item (e.g., the physical glasses) being sold or vended. As such, the starting image 402a may include the glasses 406 that show an outline representative of at least a portion of the physical glasses. In some implementations, the opening image(s) or movie may show exemplary interactions using the glasses 406. Such interactions may include, for example, viewing and responding to emails or texts, and/or viewing information regarding the surrounding environment, such as weather information or information regarding items on the apposite side of the display panel 404. In some implementations, the display panel may provide a contact number 408 that may be used to access interactive and/or pseudo-interactive capabilities of the visual display 400. In some implementations, for example, the contact number 408 may be a text number and/or a phone number that may be contacted by the user via, for example, a text or a phone call, respectively, from a communication device 124 or from a user input kiosk 126 of the user.

Figure 4B:
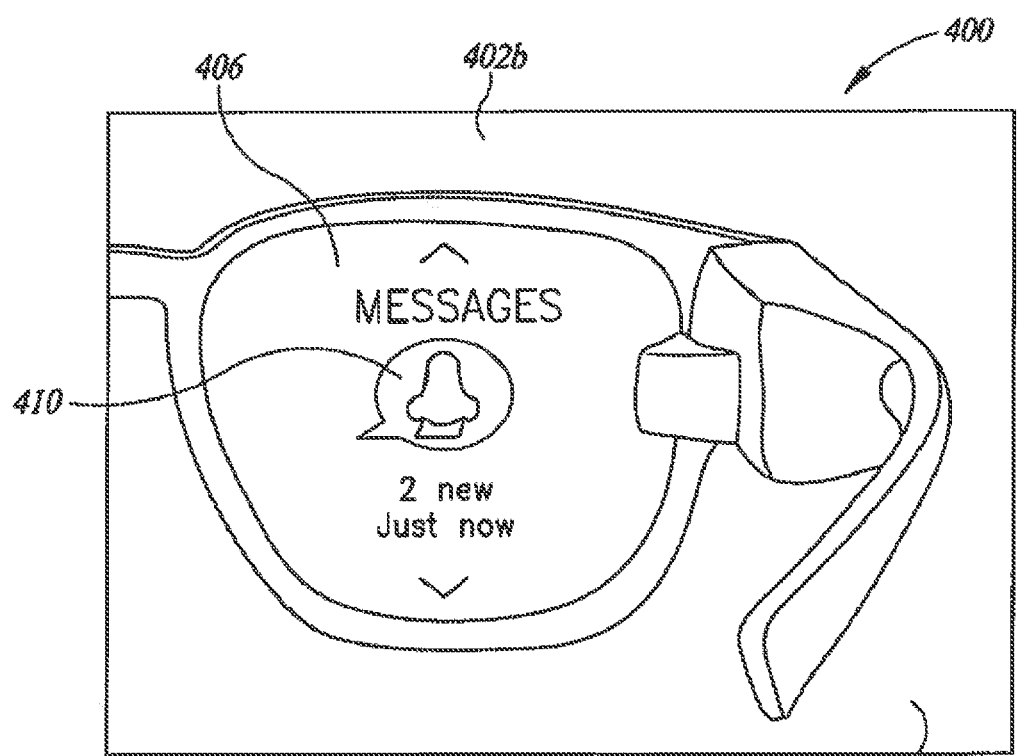
FIG. 4B is a front view (from the user's point of view) of a visual display presenting a text message notification screen in accordance with the present systems, devices, and methods.
Figure 4C:
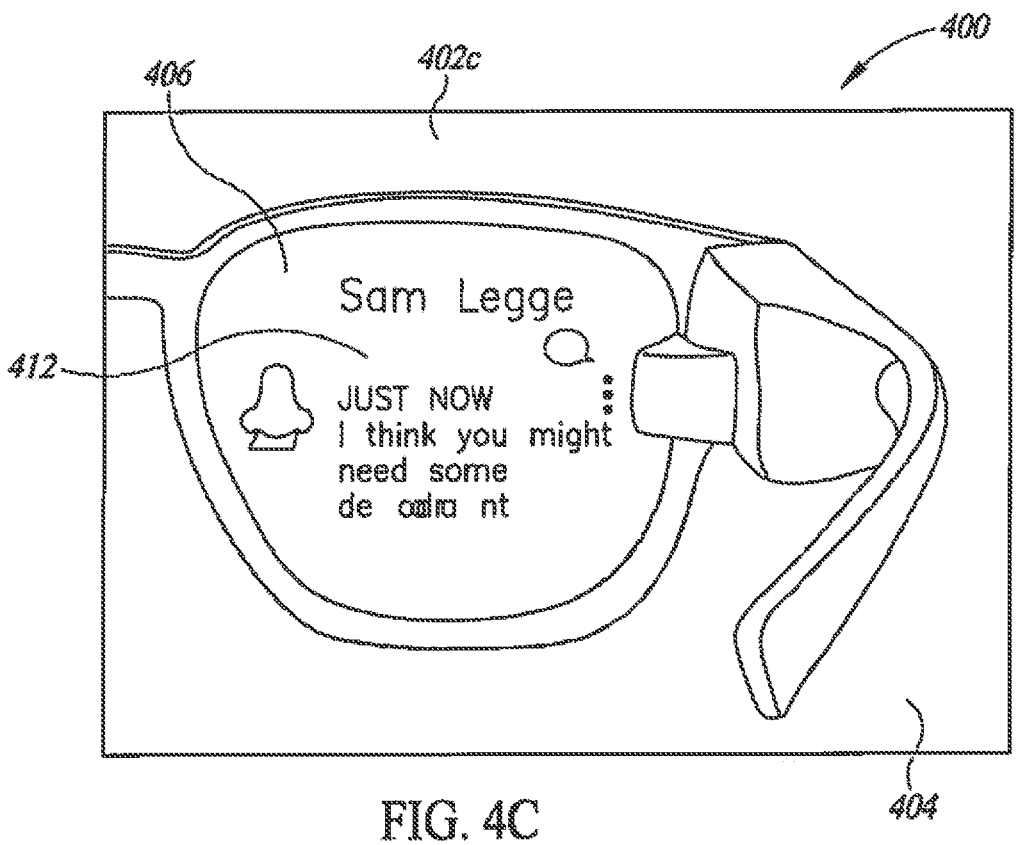
FIG. 4D is a front view (from the user's point of view) of a visual display presenting a screen showing information regarding the surrounding environment in accordance with the present systems, devices, and methods.

In some implementations, the receipt of a text message or phone call at the displayed number may cause an interactive routine to be started. The interactive routine may, for example, show a series of text message indications 410 and possible text message conversations 412 on the glasses 406 that are conveyed in the images 402b, 402c by the display panel 404, as shown, for example, in FIGS. 4B and 4C, respectively. Such text message indications 410 and text message conversations 412 may be placed on the glasses 406 based on the manner in which related text message indications and text message conversations may be displayed on the physical glasses. Exemplary displays on the glasses 406 of such text message indications 410 and text message conversations 412 are shown, for example, in FIGS. 4B and 4C, respectively.

In some implementations, the text message conversation 412 may be based at least in part on the communication received at the contact number 408 from a user via the communication device 124 of the user. In some implementations, at least some of a text message received at the contact number 408 from the communication device 124 of the user may be displayed via the image 402c conveyed by the display panel 404, as shown, for example, in FIG. 4C. In such an implementation, the responses to the text message receive from the communication device 124 of the user may be automatically generated based upon an analysis of the text message received from the communication device 124 of the user. In some implementation, the text message conversation may be at least partially pre-recorded or "canned." In such an implementation, the text message conversation 412 conveyed by the display panel 404 may remain the same regardless of the text message received from the communication device 124 of the user.

Figure 4D:
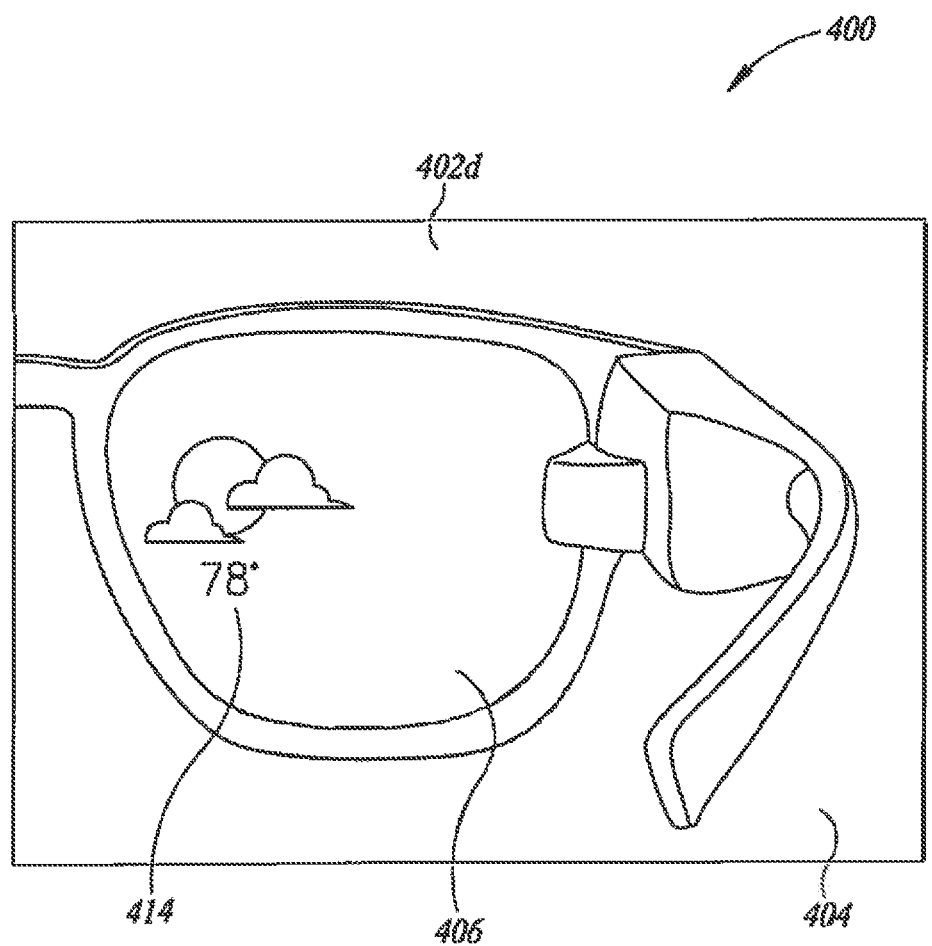

FIG. 4D shows a display panel 404 in which the image 402d is used to present environment information 414, such as, for example, weather information for the area or vicinity of the display panel 404. Such environment information 414 may be depicted on the glasses 406 based, at least in part, on how such environment information 414 may be presented on a pair of corresponding physical glasses. In such implementations, the environment information 414 may be reflective of the actual weather or environmental conditions in the surrounding area or vicinity. Such information may be obtained from public sources. In some implementations, the environment information 414 may be pre-recorded or "canned." In some implementations, the portion of the display, panel 404 that corresponds to the eye piece of the glasses 406 may correspond to the weather or environment information 414 displayed on the screen. Accordingly, such weather or environment information 414 may not be related to the weather or environment surrounding the display panel 404, but instead, may be used to show users various other types of environment (e.g., a tropical island or a ski slope).

Figure 5A:
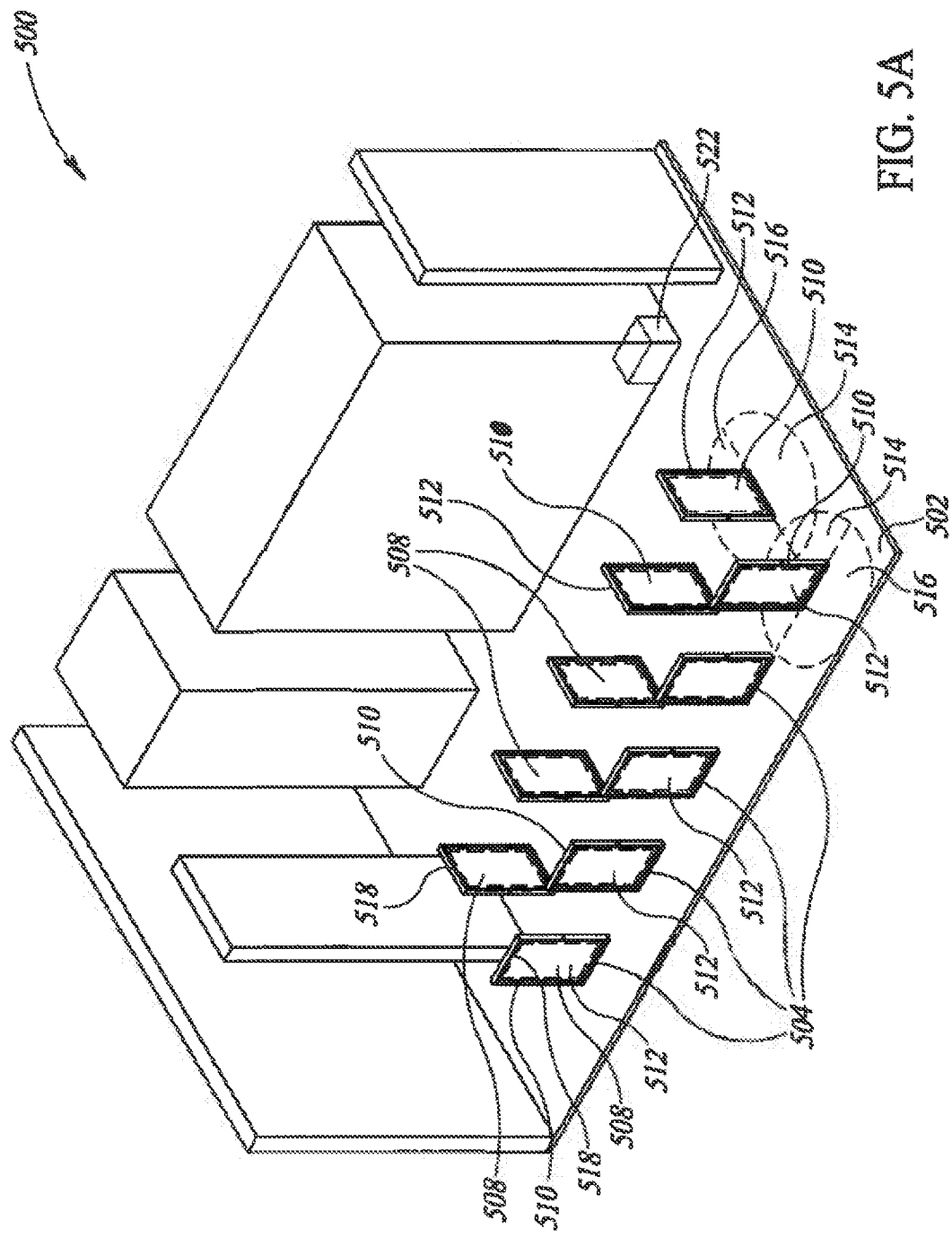
FIG. 5A is a top isometric view of a retail environment that includes a display floor with a plurality of visual displays in a first arrangement in accordance with the present systems, devices, and methods.
Figure 5B:
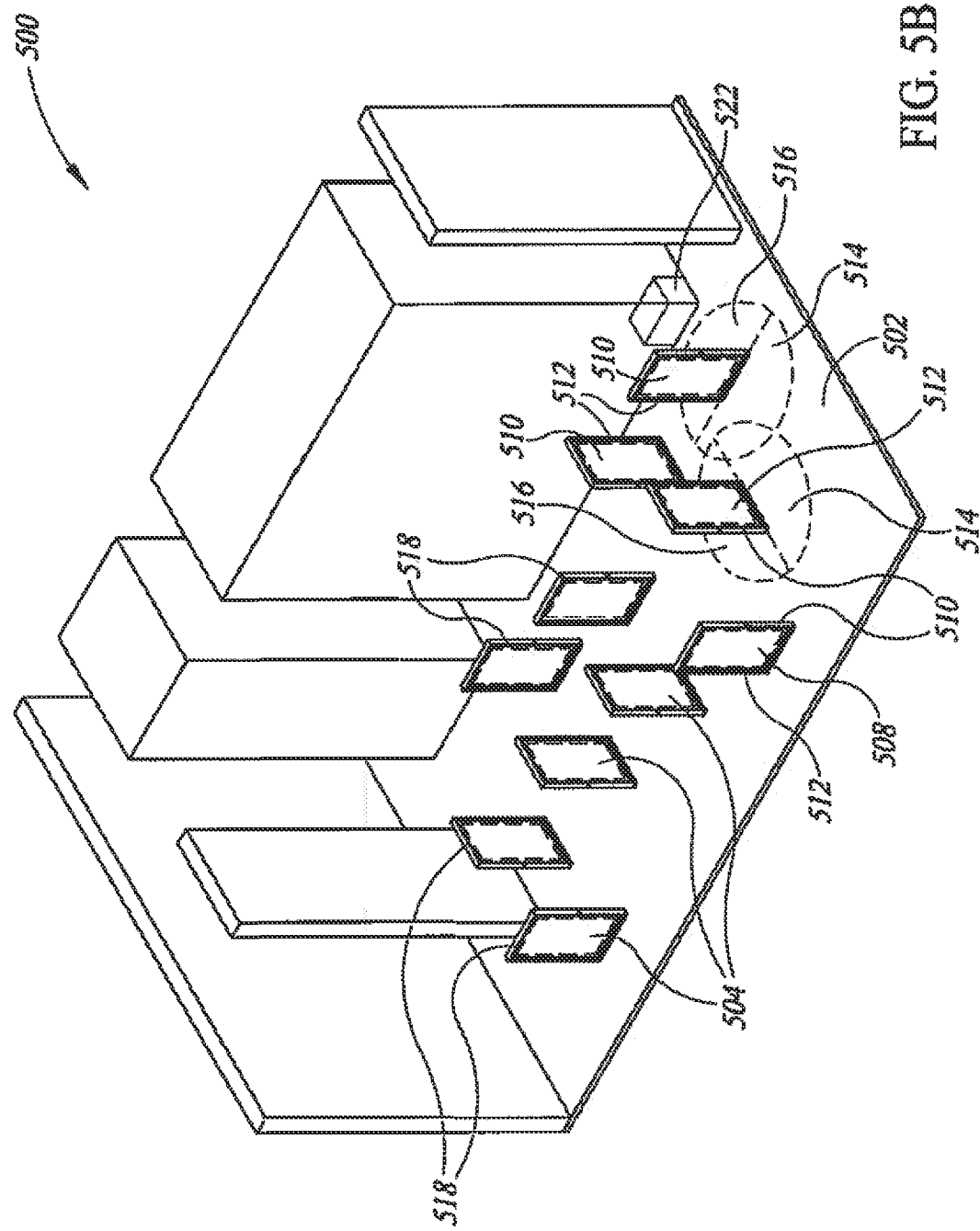
FIG. 5B is a top isometric view of a retail environment that includes a display floor with a plurality of visual displays in a second arrangement in accordance with the present systems, devices, and methods.
Figure 5C:
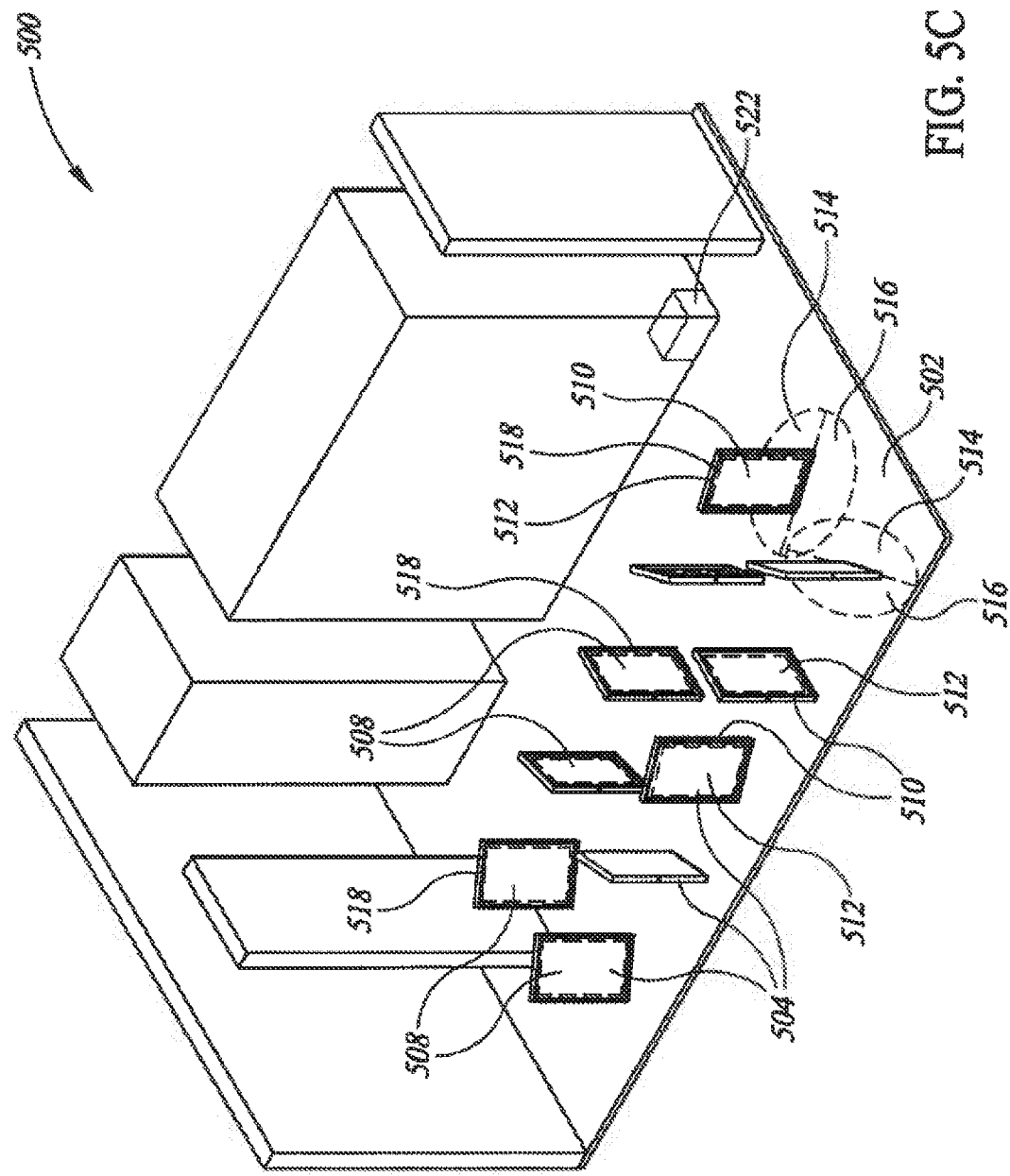
FIG. 5C is a top isometric view of a retail environment that includes a display floor with a plurality of visual displays in a third arrangement in accordance with the present systems, devices, and methods.
Figure 5D:
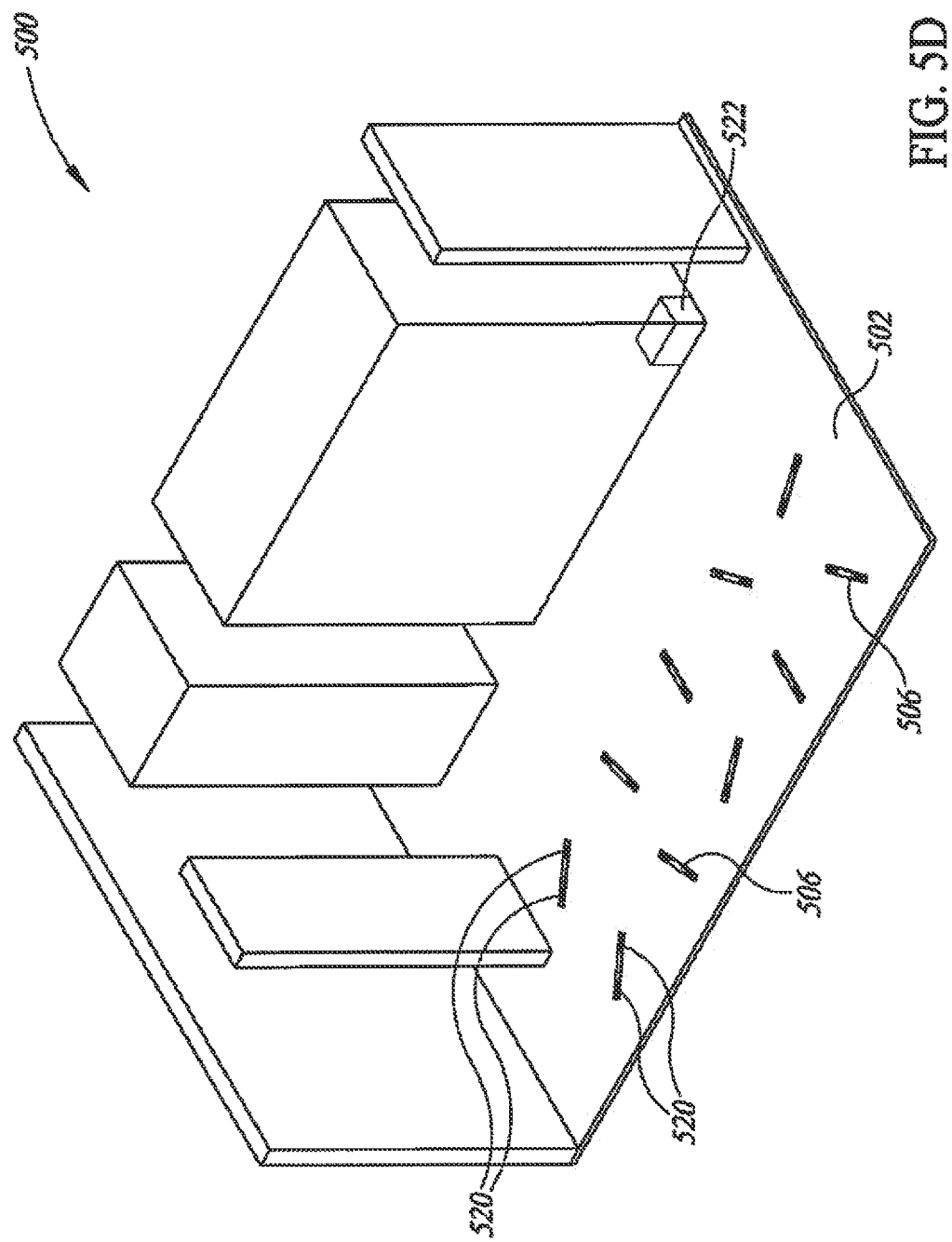
FIG. 5D is a top isometric view of a retail environment that includes a display floor with a plurality of docks that are each sized and shaped to receive a visual display in accordance with the present systems, devices, and methods.

FIGS. 5A through 5C a retail environment 500 that includes a display floor 502 with includes various arrangements of a plurality of visual display systems 504 in accordance with the present systems, devices, and methods. In some implementations, each of the plurality of visual display systems 504 may be physically coupled to a corresponding dock 506 that may be set within the display floor, as shown in FIG. 5D. Each of the visual display systems 504 may be selectively, removably received by a corresponding dock 506. As such, the visual display systems 504 may be conveniently re-arranged to make different types of retail experiences.

Each of the visual display systems 504 includes a display panel 508 and a visual source (not shown). Each display panel 508 may have a height and a length, along with a first face 510 and a second face 512, separated by a width (not shown). In some implementations, at least some of the display panels 508 on the display floor 502 may have different heights. For example, in some implementations, the display panels 508 may be one of three heights, for example, a tall height (e.g., over 6 feet tall), a medium height (e.g., 5-6 feet), and a short height (e.g., under 5 feet). In some implementations, the first face 510 and/or second face 512 of the display panel may be oriented to intersect the display floor 502 substantially perpendicularly. In some implementations, the first face 510 and/or the second face 512 may be oriented to intersect the display floor 502 at an angle, such that the first face 510 may be tilted, for example, to face downward towards the ground or upwards towards a ceiling.

The first face 510 of each visual display system 504 may face out towards a first area 514, and the second face 512 may face out towards a second area 516 (two shown in each of FIGS. 5A through 50). In some implementations, the first area 514 and/or the second area 516 of one of the plurality of visual display systems 504 on the display floor 502 may overlap with the first area 514 and/or second area 516 of another of the visual display systems 504 on the display floor 502. In some implementations, the first face 510 and/or the second face 512 may have a shape other than a rectangle.

In some implementations, at least some of the plurality of visual display systems 504 may include a frame 518 that extends around at least a portion of the display panel 508. In some implementations, for example, the frame 518 may extend entirely or partially around a perimeter of the display panel 508. In some implementations, the frame 518 may include one or more couplers that may attach to corresponding couplers 520 located in the docks 506. As such, each dock 506 and/or set of couplers 520 may maintain a corresponding visual display system 504 in a substantially upright position on the display floor 502.

Each display panel 508 may be comprised of one or more types of transparent materials. In some implementations, the display panel 508 may be comprised of one or more of glass, plastics, and/or other types of composite materials. In some implementations, the display panel 508 may include a coating or other material that at least partially obscures images of objects on the opposing side of the display panel. In some implementations, each display panel 102 may convey images to either or both of the respective first area 514 and/or the respective second area 516. In some implementations, at least a portion of each display panel 508 may include one or optical elements (e.g., lenses, reflectors, beam splitter, or the like) that may be used to direct one or more light signals in a defined direction. In some implementations, at least a portion of each display panel 508 may incorporate one or more light generating elements, such as a set of organic light emitting diode (OLED) elements, liquid crystal display (LCD), liquid crystal on silicon (LCoS), digital micro-mirrors (DMD), or other like technology.

The optical elements and/or light generating elements in each display panel 508 may be used to convey light signals out of either or both of the respective first face 510 and/or the respective second face 512 of the display panel 508. Such light signals may be used to project images to one or more of the respective first area 514 and/or the respective second area 516. In some implementations, the images may be projected to a specific location within the respective first area 514 and/or the respective second area 516. In such implementations, a user may need to be located at the specific location, such as, for example in the first area 514, to view the projected images. In some implementations, the projected images may appear to be overlaid with objects located on the other side of the display panel 508, such as, for example, in the second area 516, when viewed by a user. For example, a user positioned within the first area 514 of one of the display panels 508 may look through the transparent display panel 508 and see objects located within the second area 516 of the respective display panel 508. When the display panel 508 projects images towards the first area 514 via the conveyed light signals, such projected images may appear to the user to be overlaid on the objects visible within the second area 516.

The images conveyed by each of the display panel 508 may be controlled by one or more controllers 522. The controllers 522 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. The controllers 522 may determine the images to be conveyed by one or more of the display panels 508 based in part upon communications received from a communication device of a user (as discussed below). In some implementations, the controllers 522 may determine the images to be conveyed by one or more of the display panels 508 based in part upon conditions within the environment surrounding the respective display panels 508 (as discussed below). Each of the controllers 522 may be communicatively coupled to one or more of the display panels 508, such as, for example, to the respective visual source of the display panels 508. As such, the controller 522 may generate and transmit one or more signals to the respective visual sources to thereby control the images generated by the visual source and conveyed by the display panel 508. In some implementations, one or more of the controllers 522 may be located proximate the plurality of display panels 508. In some implementations, one or more of the controllers 522 may be located away from the plurality of display panels 508.

Figure 6:
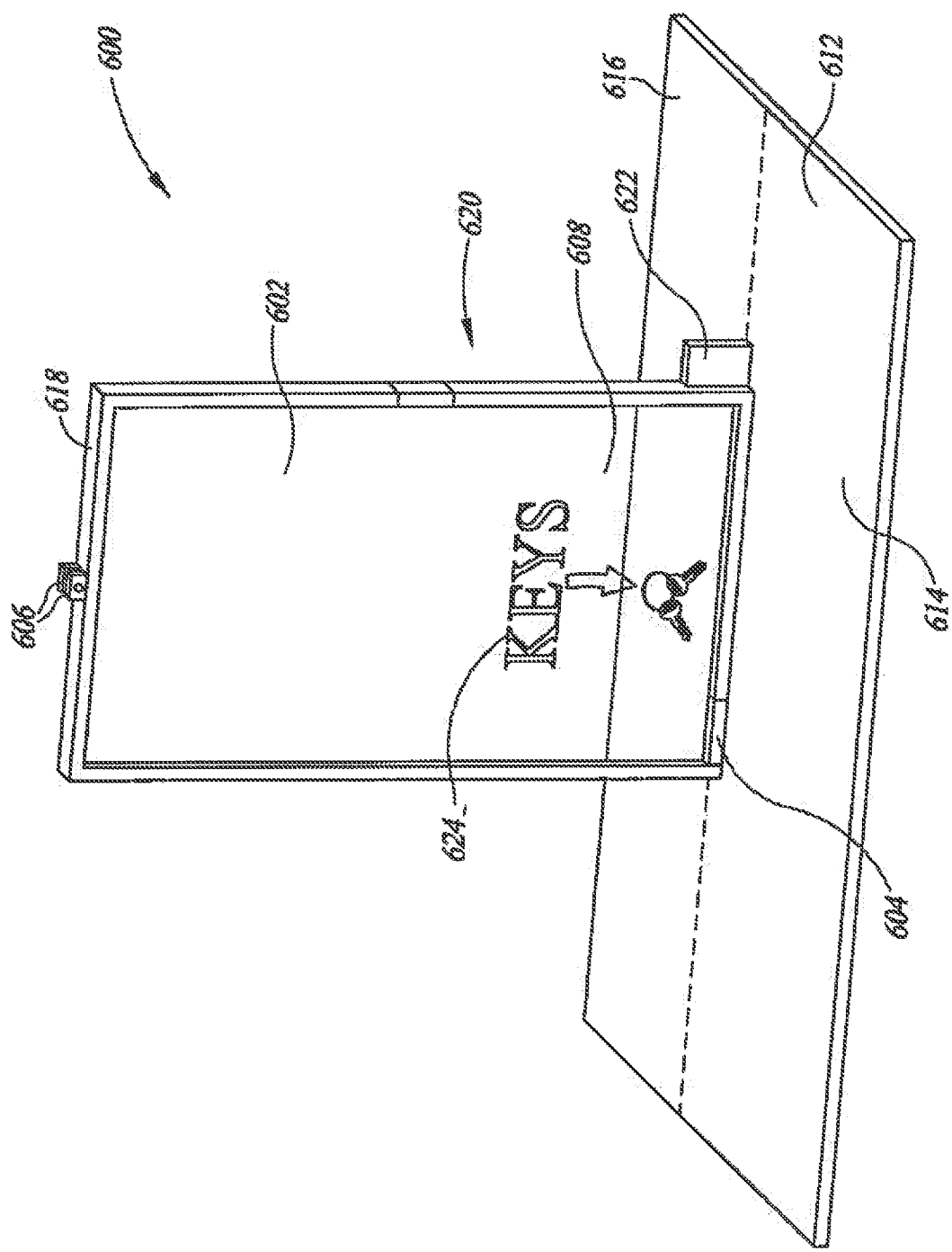
FIG. 6 is an isometric view of a visual display with a display panel, a visual source, and one or more imagers in accordance with the present systems, devices, and methods.

FIG. 6 shows a visual display system 600 with a display panel 602, a visual source 604, and one or more imagers 606 in accordance with the present systems, devices, and methods. The display panel 602 may have a first face 608 and a second face 610, separated by a width (not shown). In some implementations, the first face 608 and/or second face 610 of the display panel may be oriented to intersect a horizontal surface 612 (e.g., a floor or the ground) substantially perpendicularly. In some implementations, the first face 608 and/or the second face 610 may be oriented to intersect the horizontal surface 612 at an angle, such that the first face 608 may be tilted, for example, to face downward towards the ground or upwards towards a ceiling. The first face 608 may face out towards a first area 614, and the second face 610 may face out towards a second area 616. In some implementations, the first face 608 and/or the second face 610 may have a shape other than a rectangle, s discussed above.

In some implementations, the visual display system 600 may include a frame 618 that extends around at least a portion of the display panel 602, as discussed above. In some implementations, for example, the frame 618 may extend above an upper portion of the display panel 602. In some implementations, the imagers 606 may be attached to the frame 618. Each of the imagers 606 may have a field of view directed towards at least one of the first area 614 and/or the second area 616. The imagers 606 may be used to capture images of objects located within the imager field-of-view.

The display panel 602 may be comprised of one or more types of transparent materials. In some implementations, the display panel 602 may be comprised of one or more of glass, plastics, and/or other types of composite materials. In some implementations, the display panel 602 may include a coating or other material that at least partially obscures images of objects on the opposing side of the display panel. In some implementations, the display panel 602 may convey images to either or both of the first area 614 and/or the second area 616. In some implementations, at least some of the display panel 602 may include one or optical elements (e.g., lenses, reflectors, beam splitter, or the like) that may be used to direct one or more light signals in a defined direction. In some implementations, at least a portion of the display panel 602 may incorporate one or more light generating elements, such as a set of organic light emitting diode (OLED) elements, liquid crystal display (LCD), liquid crystal on silicon (LCoS), digital micro-mirrors (DMD), or other like technology.

The optical elements and/or light generating elements may be used to convey light signals out of either the first face 608 and/or the second face 610. Such light signals may be used to project images to one or more of the first area 614 and/or the second area 616. In some implementations, the images may be projected to a specific location within the first area 614 and/or the second area 616. In such implementations, a user may need to be located at the specific location to view the projected images. In some implementations, the projected images may appear to be overlaid with objects located on the other side of the display panel 602 when viewed by a user. For example, a user positioned within the first area 614 may look through the transparent display panel 602 and see objects located within the second area 616. When the display panel 602 projects images towards the first area 614 via the conveyed light signals, such projected images may appear to the user to be overlaid on the objects visible within the second area 616.

The visual source 604 may be used to generate the images to be conveyed via the display panel 602, as discussed above. The images conveyed by the display panel 602 may be controlled by a controller 622, as discussed above. The controller 622 may determine the images to be conveyed by the display panel 602 based in part upon communications received from a communication device of a user (as discussed below). In some implementations, the controller 622 may determine the images to be conveyed by the display panel 602 based in part upon conditions within the environment surrounding the display panel 102 (as discussed below). For example, in some implementations, the controller 622 may be communicatively coupled to the imager(s) 606. In such implementations, the controller 622 may receive signals from the imager(s) 606 that may be used to detect items or objects (e.g., keys 624) within the first area 614 and/or second area 616 using, for example, image and/or shape recognition capabilities. The controller 622 may be communicatively coupled to the visual source 604. As such, the controller 622 may generate and transmit one or more signals to the visual source 604 to thereby control the images generated by the visual source. The controller 622 may base such images on the items or objects detected in the first area 614 and/or second area 616, such as by including an image indicating the location of the keys 624.

Figure 7:
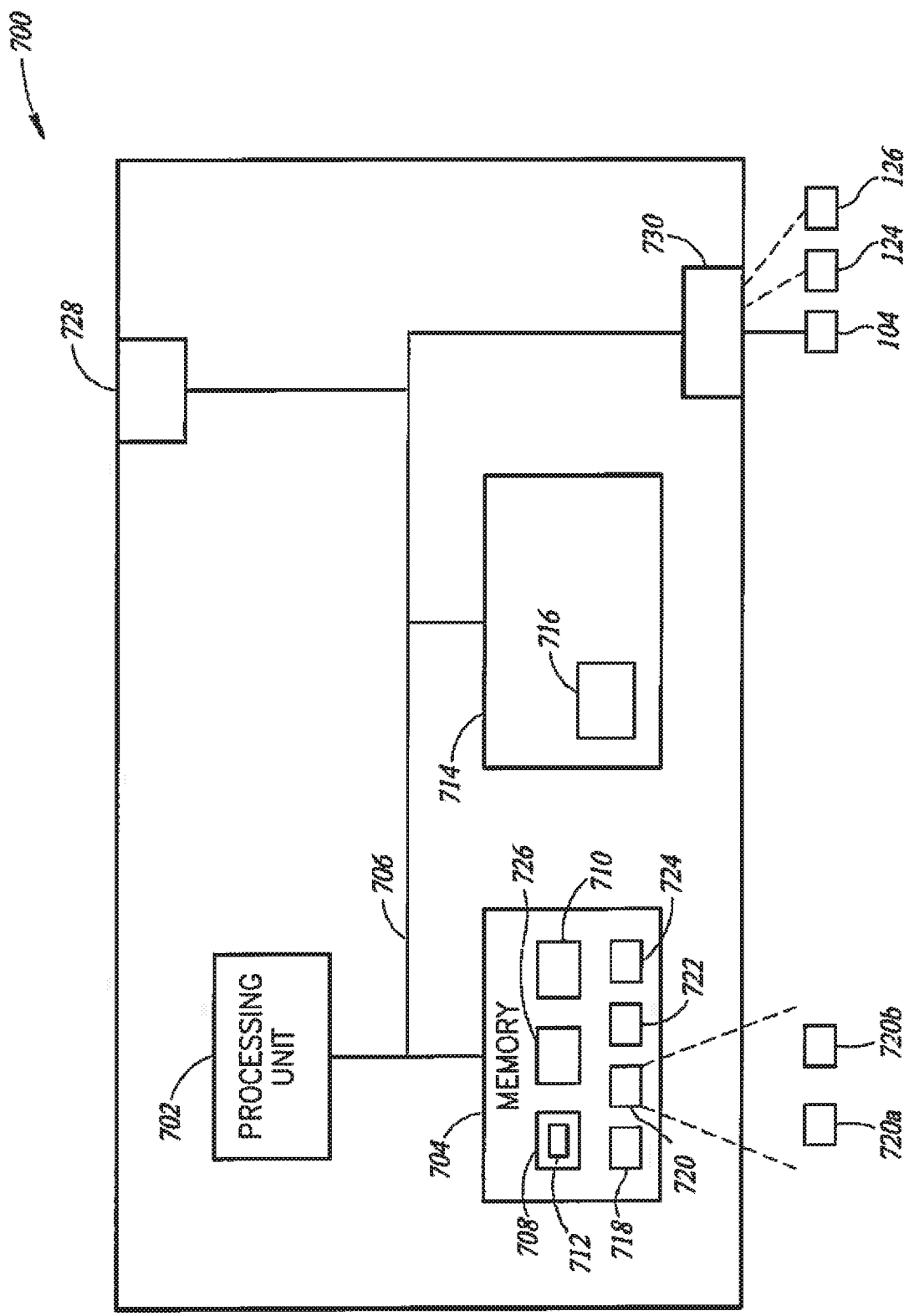
FIG. 7 is a block diagram of a controller, according to at least one illustrated implementation.

FIG. 7 shows a controller 700, according to at least one illustrated implementation. Such a controller 700 may be used as part of, or to implement, one or more of the controller 122, 522 associated with the visual display 100, for example. The controller 700 may take the form of any current or future developed computing system capable of executing one or more instruction sets. The controller 700 includes a processing unit 702, a system memory 704 and a system bus 706 that communicably couples various system components including the system memory 704 to the processing unit 702. The controller 700 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 702 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. In some implementations, some or all of the processing unit 702, the memory 704, and one or more other components discussed below may be included within a single integrated circuit, such as may occur, for example, with a system on chip (SoC).

The system bus 706 can employ any known bus structures or architectures, including a memory bus with memory controller, a peripheral bus, and a local bus. The system memory 704 includes read-only memory ("ROM") 708 and random access memory ("RAM") 710. A basic input/output system ("BIOS") 712, which can form part of the ROM 708, contains basic routines that help transfer information between elements within the controller 700, such as during start-up. Some implementations may employ separate buses for data, instructions and power.

The controller 700 also includes one or more internal nontransitory storage systems 714. Such internal nontransitory storage systems 714 may include, but are not limited to, any current or future developed persistent storage device 716. Such persistent storage devices 716 may include, without limitation, magnetic storage devices such as hard disc drives, electromagnetic storage devices such as memristors, molecular storage devices, quantum storage devices, electrostatic storage devices such as solid state drives, and the like.

The one or more internal nontransitory storage systems 714 communicate with the processing unit 702 via the system bus 706. The one or more internal nontransitory storage systems 714 may include interlaces or device controllers (not shown) communicably coupled between non-transitory storage system and the system bus 706, as is known by those skilled in the relevant art. The nontransitory storage systems 714 and associated storage devices 716 provide nonvolatile storage of computer-readable instructions, data structures, program modules and other data for the controller 700. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 704, such as an operating system 718, one or more application programs 720, other programs or modules 722, drivers 724 and program data 726.

The application programs 720 may include, for example, one or more machine executable instruction sets (i.e., welcome screen 720a) capable of displaying a welcome image or video on a visual display system 100. The application programs 720 may include, for example, one or more machine executable instruction sets (interactive display 720b) capable of providing an interactive presentation on a visual display system 100. The application programs 720 may be stored as one or more executable instructions.

In some implementations, the controller 700 operates in an environment using one or more of the network interfaces 728 to optionally communicably couple to one or more remote computers, servers, display devices, and/or visual displays 100 via one or more communications channels. These logical connections may facilitate any known method of permitting computers to communicate, such as through one or more LANs and/or WANs, Such networking environments are well known in wired and wireless enterprise-wide computer networks, intranets, extranets, and the Internet.

Further, local communication interface 730 may be used for establishing communications with other components in a local device, such as may occur, for example, when the controller 700 is located proximate a visual display system 100. For example, the local communication interface 730 may be used to communicate with the visual source 104, communication device 124 and/or user input kiosk 126. In such an implementation, the signals transmitted from the local communication interface 730 to the visual source 104 may be used to control the images generated by the visual source 104.

Figure 8:
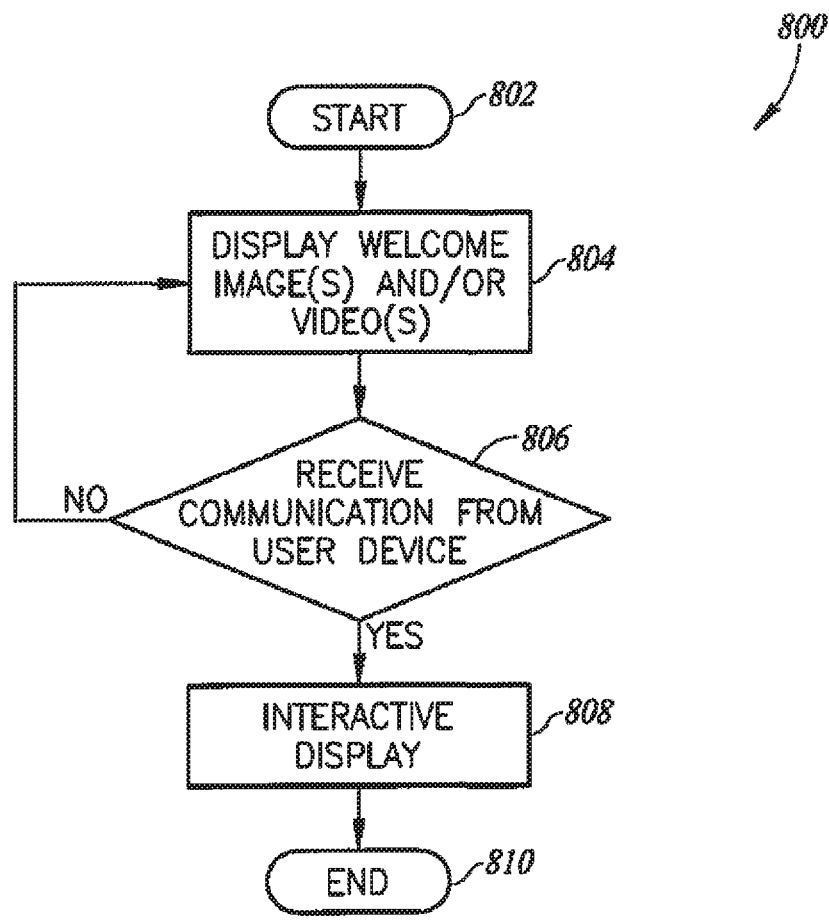
FIG. 8 is a logic flow diagram of a method of implementing an interactive display in accordance with the present systems, devices, and methods.

FIG. 8 shows a method 800 of implementing an interactive display in accordance with the present systems, devices, and methods. Method 800 starts at 802, at which a processor-based device, for example, the controller 700, is turned on and/or is initiated.

At 804, a processor enabled component, such as the controller 700, generates one or more signals to display a welcome image or set of welcome images and/or videos. Such welcome images and/or videos may be displayed, for example, via the display panel 102 of a visual display system 100. In some implementations, the welcome image and/or video may be used to present features of a product that is being sold at a retail location (e.g., interactive glasses). In some implementations, the welcome images and/or videos may include directions on how a user could enter into an interactive mode of operation via the display panel 102. Such directions may include a contact number 408, such as for example, a text and/or phone number, to which the user could transmit a text and/or voice message.

At 806, a processor enabled component, such as the controller 700, determines if a communication, such as a text and/or voice message, has been received at the indicated contact number 408. If no communication has been received, the controller 700 returns to 804 to display the welcome image(s) and/or videos. If a communication has been received at the contact number 408, then the controller proceeds to 808.

At 808, an interactive display is presented via the display panel 102 of the visual display system 100. In some implementations, the interactive display may include a possible text message conversations that is conveyed in the images presented by the display panel 102 (see, e.g., FIGS. 4A through 4C). As such, in some implementations, such a text message conversation may be based at least in part on the communication received at the contact number 408 from a user via the user's communication device 124. In such an implementation, the responses to the text message receive from the communication device 124 of the user may be automatically generated based upon an analysis of the text message received from the communication device 124 of the user. In some implementations, the interactive display may present environment information 414 that may be reflective of conditions within one or both of the first area 114 and/or the second area 116. In some implementations, the interactive display at 808 may present environment information 414 that may be reflective of the actual weather or environmental conditions in the surrounding area or vicinity.

At 810, the method 800 terminates, for example until invoked again. Alternatively, the method 800 may repeat continuously or repeatedly, or may execute as multiple instances of a multi-threaded process.

Throughout this specification and the appended claims, reference is often made to static light-redirecting elements located on or proximate a visual display. Examples of such static light-emitting structures include, without limitation, prismatic structures deposited directly on the lens as a thin film (e.g., optical lighting film, or OLF, available from 3G).

In some implementations, one or more optical fiber(s) may be used to guide light signals along some of the paths illustrated herein. For example, light may travel from a light source to a first point of redirection (e.g., to a light-redirection element) through one or more optical fiber cable(s).

The visual displays described herein may include one or more sensor(s) (e.g., microphone, camera, thermometer, compass, and/or others) for collecting data from the user's environment. For example, one or more camera(s) may be used to provide feedback to the processor of the visual display and influence where on the transparent display(s) any given image should be displayed.

The visual displays described herein may include one or more on-board power sources (e.g., one or more battery (ies)), a wireless transceiver for sending/receiving wireless communications, and/or a tethered connector port for coupling to a computer and/or charging the one or more on-board power source(s).

The visual displays described herein may receive and respond to commands from the user in one or more of a variety of ways, including without limitation: voice commands through a microphone; touch commands through buttons, switches, or a touch sensitive surface; gesture-based commands through gesture detection systems; and/or communications received from a communication device.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other visual displays, not necessarily the exemplary visual displays generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An interactive visual display configured to be communicatively coupled to a mobile communication device, the visual display comprising:
    a display panel, the display panel which is transparent and has a front face and an opposing back face, wherein the front face and the back face are separated by a width, the front face is oriented to be disposed between a first area and a second area, and the display panel includes a display zone that conveys an image towards the first area; and
    a visual source, which generates the image conveyed by the display zone of the display panel and generates the conveyed image based at least in part on a text message received from the mobile communication device, wherein the conveyed image is different from the text message.

2. The interactive visual display of claim 1, further comprising:
    a controller, which receives the text message from the mobile communication device and determines the image to be conveyed to the first area based at least in part on the received text message.

3. The interactive visual display of claim 1, wherein the conveyed image is based at least in part on at least one of a condition or an object present in the second area.

4. The interactive visual display of claim 1 wherein the display panel is offset by a distance from a surface, and wherein the offset distance is selectively adjustable.

5. The interactive visual display of claim 1 wherein the display panel is arranged at an angle to a horizontal surface.

6. The interactive visual display of claim 5 wherein the angle is selectively adjustable.

7. The interactive visual display of claim 1 wherein the visual source is a projector.

8. The interactive visual display of claim 1 wherein the visual source includes a plurality of pixel elements that are contained in the display panel.

9. The interactive visual display of claim 1 wherein the image conveyed by the visual source includes at least a portion of a pair of glasses, wherein the portion of the pair of glasses includes a message area, the message area displaying visual information.

10. The interactive visual display of claim 9 wherein the visual information is based at least in part on the text message received from the mobile communication device.

11. The interactive visual display of claim 9 wherein the visual information is based at least in part on one or more environmental conditions in an environment proximate the interactive visual display.

12. The interactive visual display of claim 9, further comprising:
    an imager that captures one or more images from at least one of the first area or the second area, wherein the visual information displayed in the message area is based at least in part on the one or more images captured by the imager.

13. A visual display system, comprising:
    a display floor; and
    at least three visual displays arranged within the display floor, each of the at least three visual displays respectively and separately including:
        a display panel, which is transparent and has a front face and an opposing back face, wherein the front face and the back face are separated by a width, the front face is oriented to be disposed between a first area and a second area, and the display panel includes a display zone that conveys an image towards the first area; and
        a visual source, which generates the image conveyed by the display zone of the display panel.

14. The visual display system of claim 13 wherein the visual source generates the conveyed image based at least in part on a text message received from an associated communication device.

15. The visual display system of claim 14, further comprising:
    a controller communicatively coupled to a plurality of the at least three visual displays, wherein the controller determines the image to be conveyed to each respective first area for each respective one of the plurality of the at least three visual displays based at least in part on the text message received from the associated communication device.

16. The visual display system of claim 15 wherein the controller is located remotely from each of the plurality of the at least three visual displays.

17. The visual display system of claim 13 wherein the first area for at least one of the at least three visual displays overlaps at least in part with the second area for at least one other of the at least three visual displays.

18. The visual display system of claim 13 wherein each display panel of the at least three visual displays has a respective display panel height and a respective display panel width, and wherein a first display panel height for one of the at least three visual displays is different from the a second display panel height for at least one other of the at least three visual displays.

19. The visual display system of claim 13 wherein at least one of the display panels is selectively rotatable about at least one of a vertical axis of rotation and a horizontal axis of rotation.

20. The visual display system of claim 13 wherein the display floor includes a plurality of docks, each sized and dimensioned to receive one of the at least three visual displays.

21. The visual display system of claim 13 wherein the display floor includes a number of docks exceeding a total number of visual displays arranged on the display floor.

22. An interactive visual display configured to be communicatively coupled to a mobile communication device, the interactive visual display comprising:
    a display panel, which is transparent and has a front face and an opposing back face, wherein the front face and the back face are separated by a width, the front face is oriented to be disposed between a first area and a second area, and the display panel includes a display zone that conveys an image towards the first area;
    a support member, which maintains the display panel in a defined position; and
    a visual source, which generates the image conveyed by the display zone of the display panel and generates the conveyed image based at least in part on a text message received from the mobile communication device, wherein the conveyed image is different from the text message.

23. The interactive visual display of claim 22 wherein the support member maintains the display panel in a defined position such that the front face is tilted at an angle of 45 degrees or less from a vertical position.

24. The interactive visual display of claim 23, further comprising:
   an anchor, which has a first end and an opposing second end, is physically coupled to the support member at the first end, and is physically coupled to a support surface at the opposing second end.

25. The interactive visual display of claim 24 wherein the support surface includes at least one of a floor, a wall, and a ceiling.

26. The interactive visual display of claim 23 wherein the display panel is selectively rotatable about at least one of a vertical axis of rotation and a horizontal axis of rotation.

* * * * *